C. F. PYM.
LASTING MACHINE.
APPLICATION FILED JUNE 24, 1911.

1,274,589.

Patented Aug. 6, 1918.
10 SHEETS—SHEET 1.

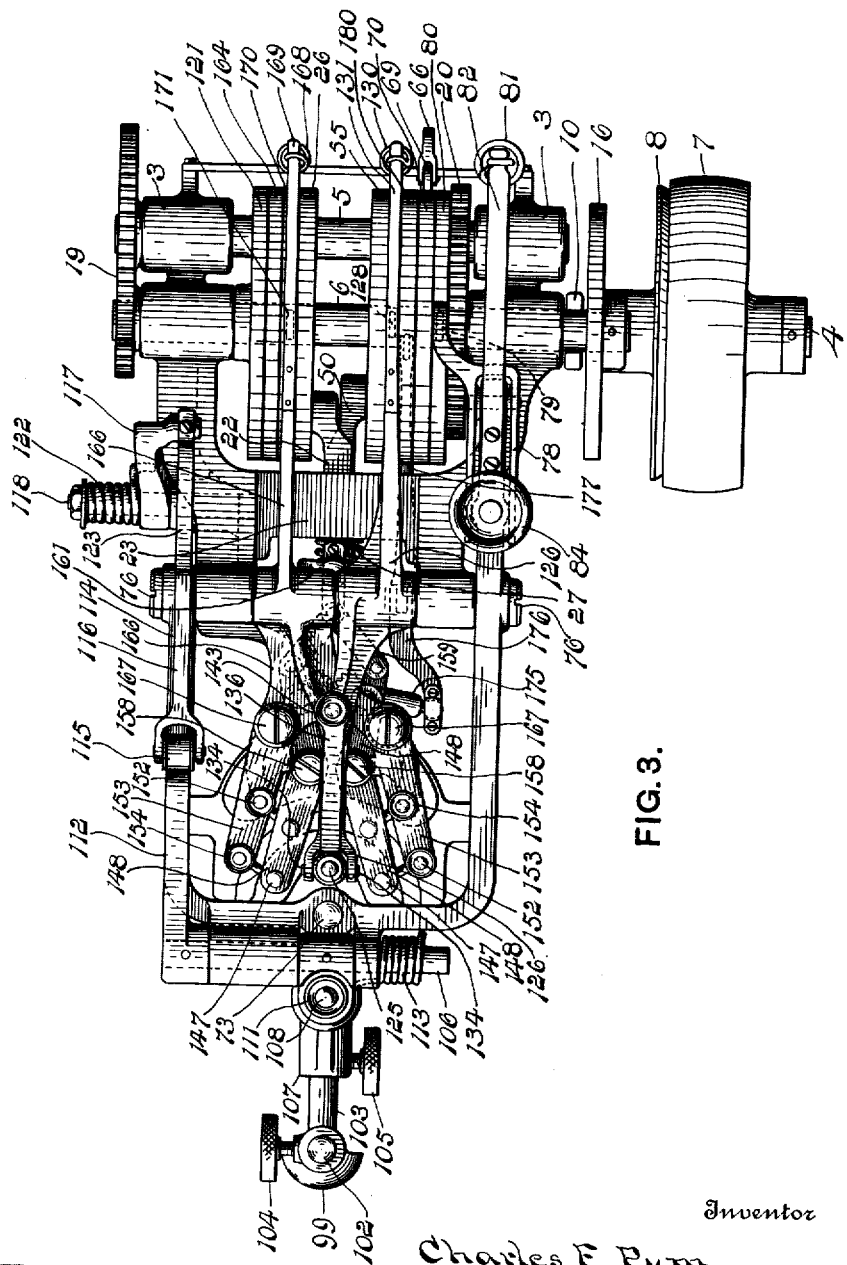

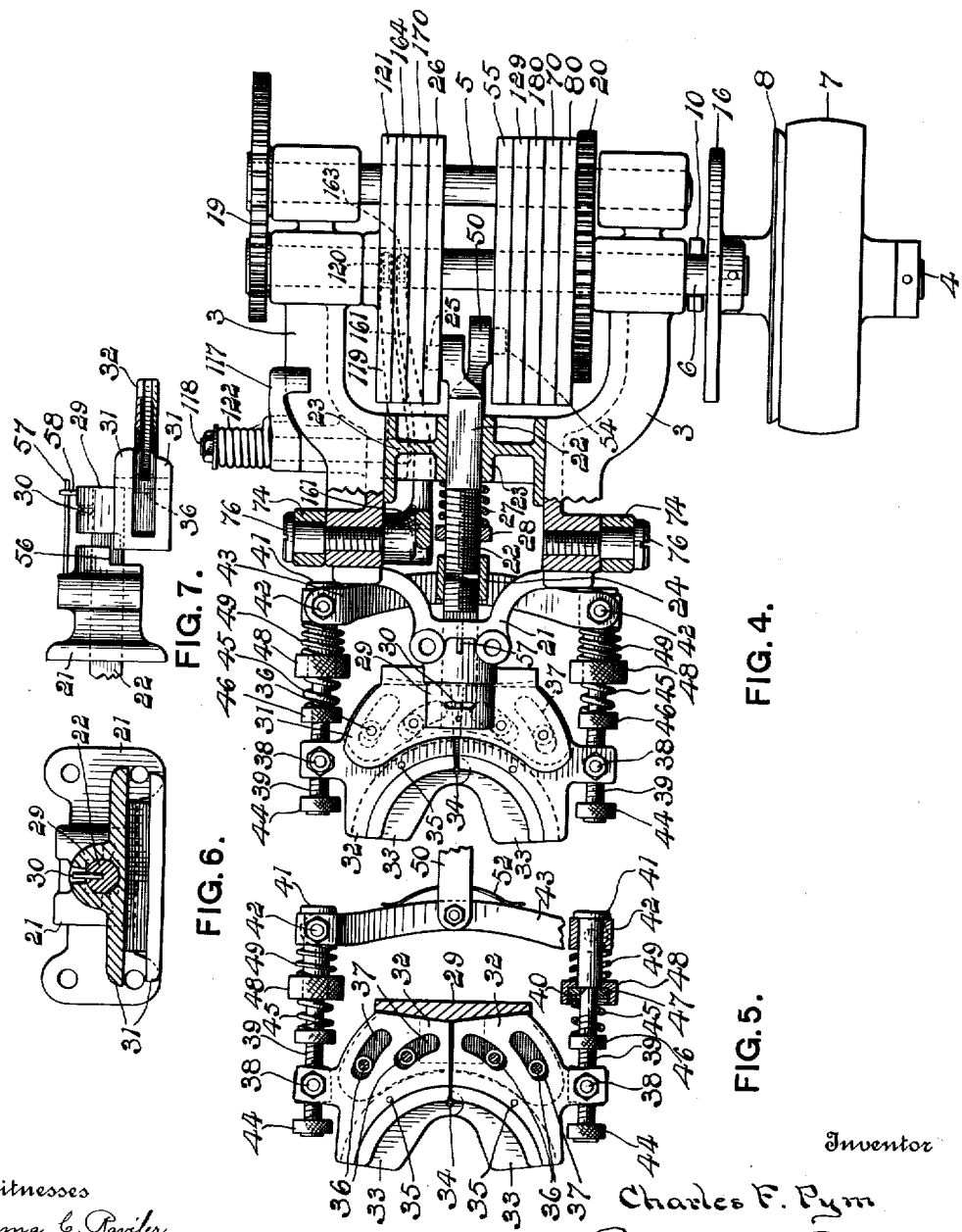

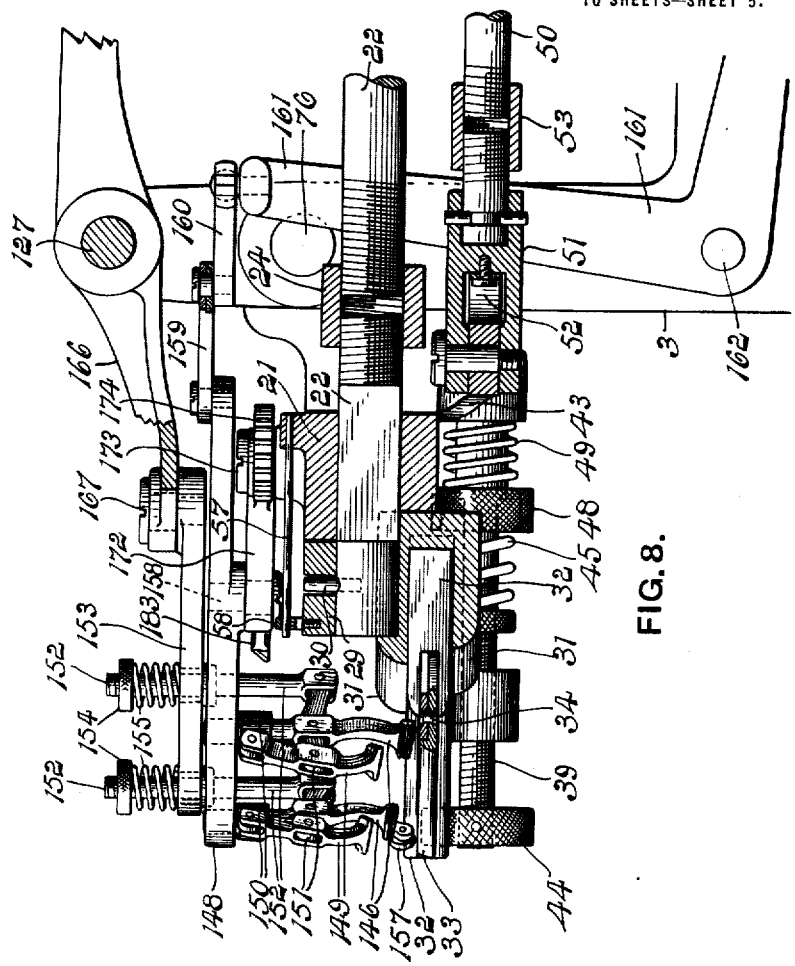

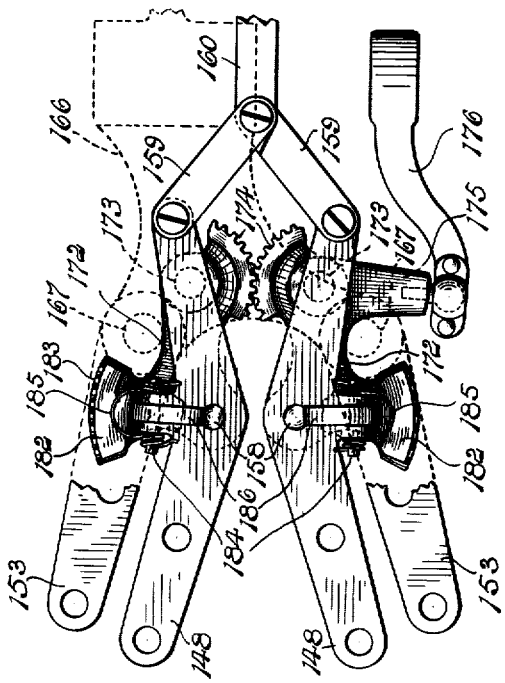

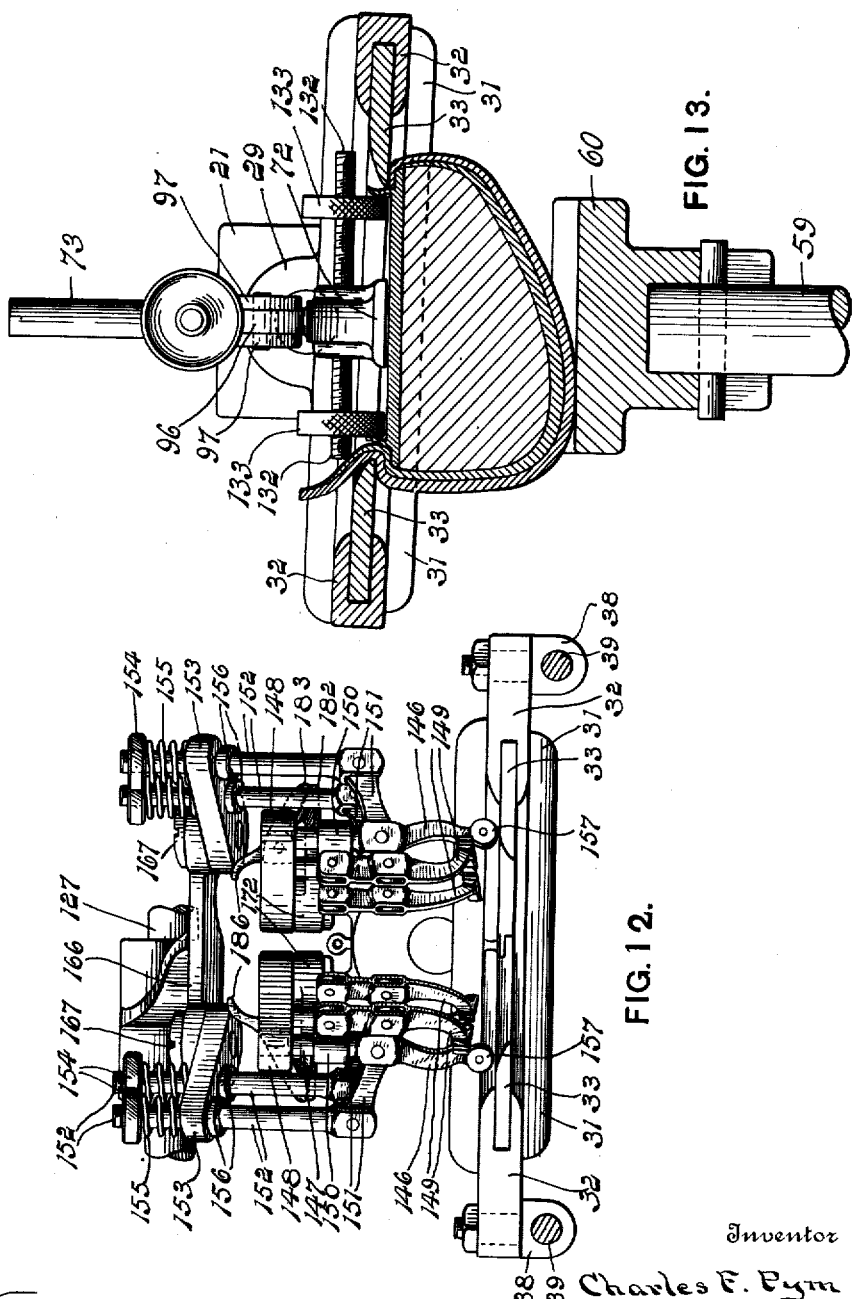

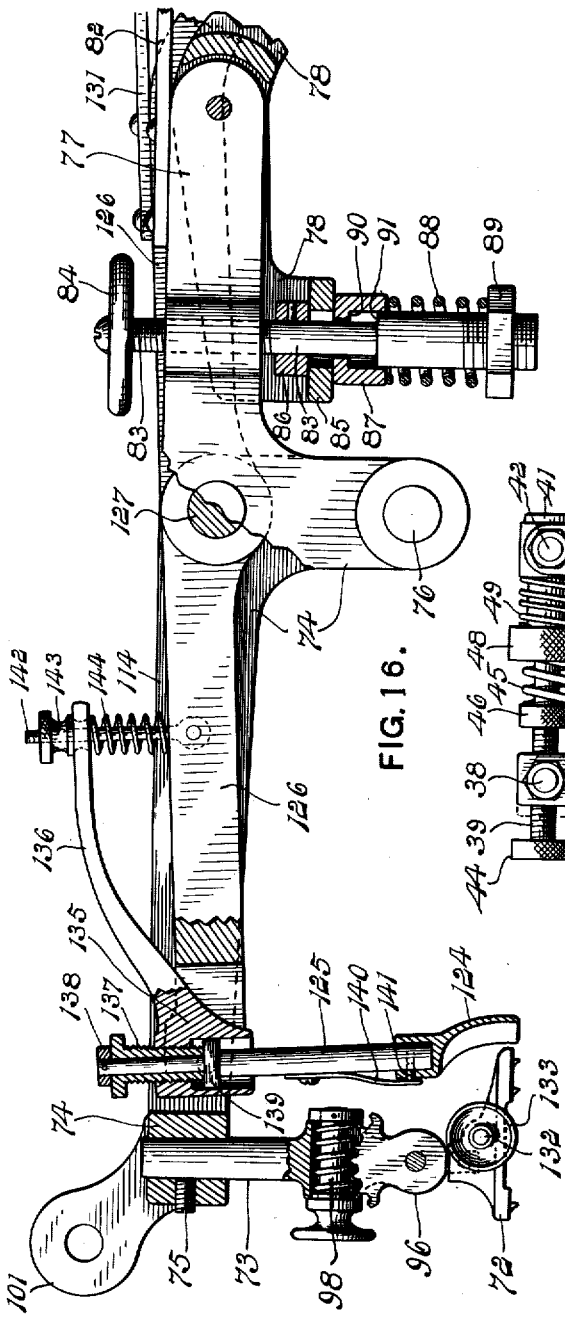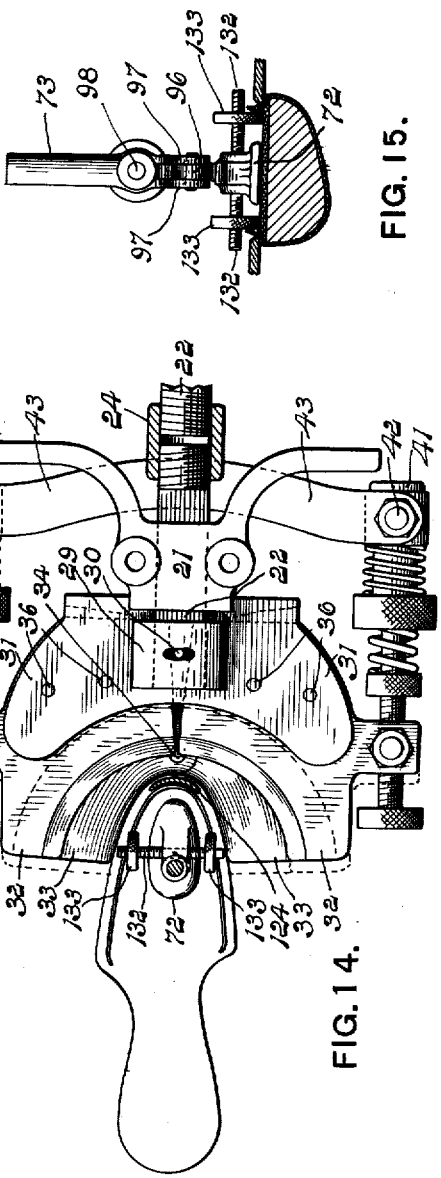

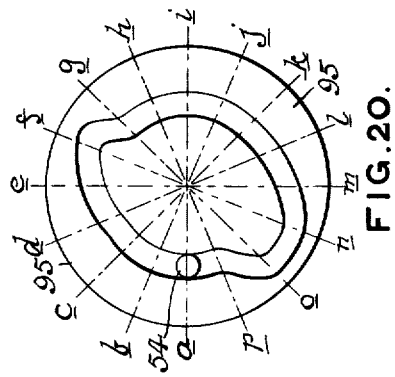
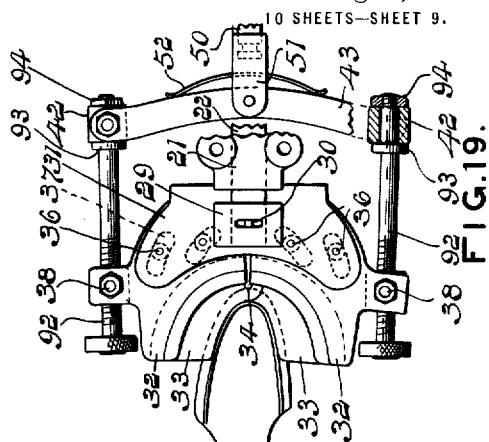

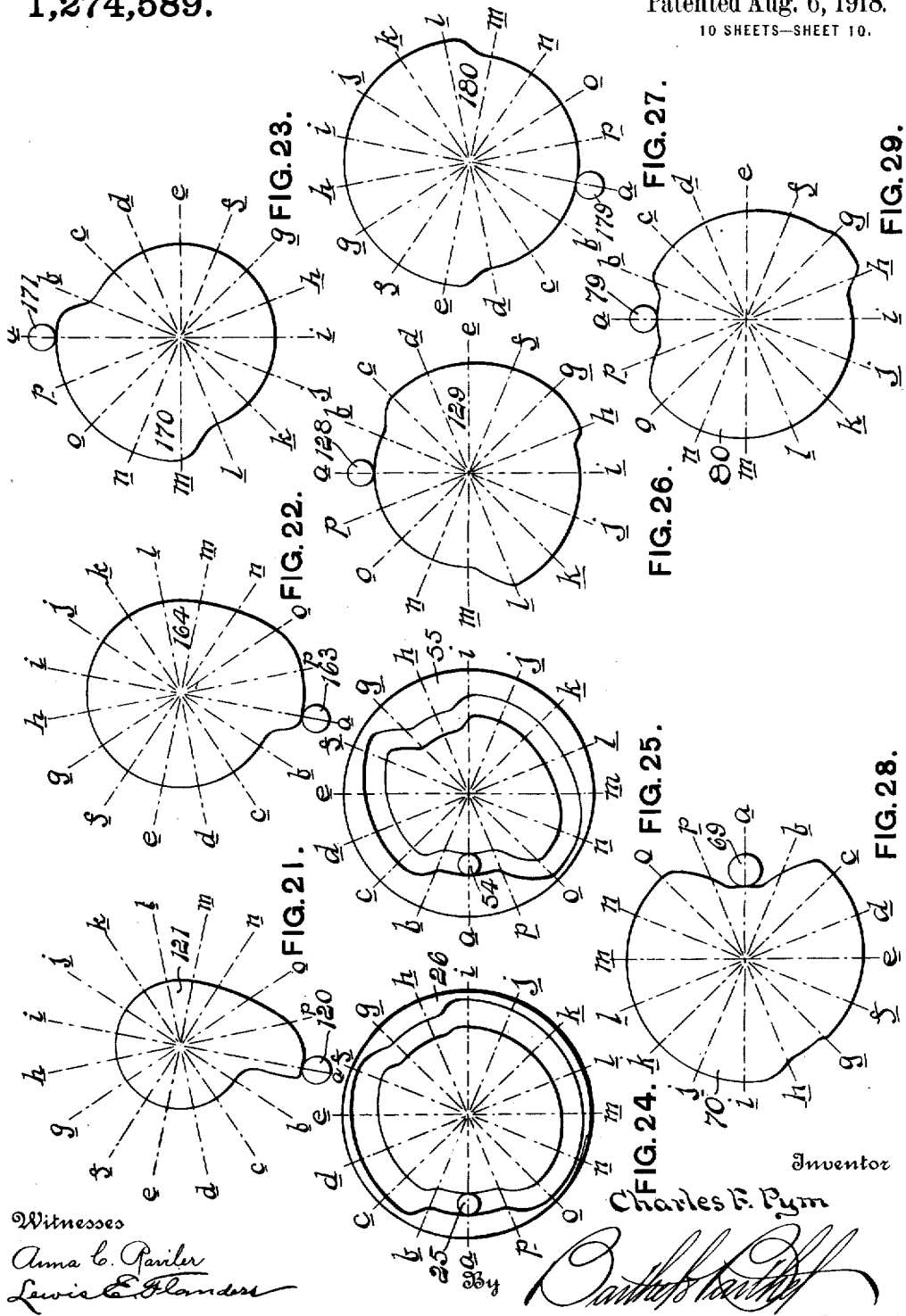

UNITED STATES PATENT OFFICE.

CHARLES F. PYM, OF ESSEX, ONTARIO, CANADA, ASSIGNOR, BY MESNE ASSIGNMENTS, TO UNITED SHOE MACHINERY CORPORATION, OF PATERSON, NEW JERSEY, A CORPORATION OF NEW JERSEY.

LASTING-MACHINE.

1,274,589.      Specification of Letters Patent.      Patented Aug. 6, 1918.

Application filed June 24, 1911. Serial No. 635,183.

*To all whom it may concern:*

Be it known that I, CHARLES F. PYM, a subject of the King of Great Britain, residing at Essex, in the county of Essex and Province of Ontario, Dominion of Canada, have invented certain new and useful Improvements in Lasting-Machines, of which the following is a specification, reference being had therein to the accompanying drawings.

This invention relates to improvements in lasting machines and is herein shown as embodied in a machine of the power driven automatic type, and an object of the invention is to provide an automatically operated power machine embodying means for wiping the upper of a boot or shoe up around the heel or toe of a last, combined with separate means for automatically stretching and spreading the upper during the lasting operation, and further to provide certain other new and useful features in the construction and arrangement of parts, the invention consisting in the matters hereinafter set forth and more particularly pointed out in the claims, reference being had to the accompanying drawings in which—

Figure 1 is a side elevation of a machine embodying the invention;

Fig. 2, a longitudinal vertical section through the same;

Fig. 3, a plan view;

Fig. 4, a horizontal section;

Fig. 5 is a sectional detail of the wiper carrying head and adjacent parts showing the wiper carrying plates in plan view;

Fig. 6 is a cross-sectional detail of the wiper carrying head;

Figure 1:
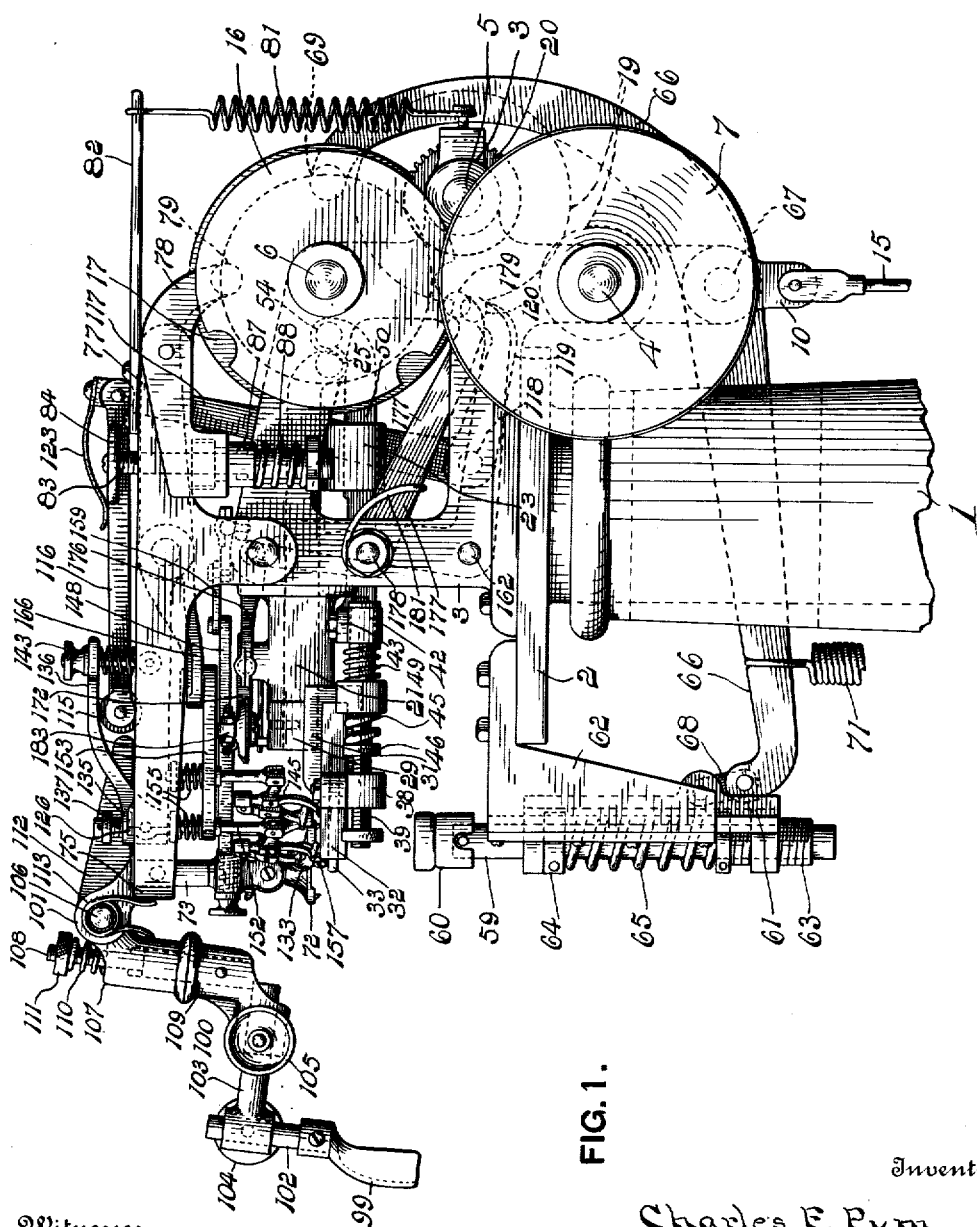

Fig. 7, a side elevation of the same with one of the wiper carrying plates in place;

Fig. 8 is an enlarged longitudinal section through the wiper carrying head and its supporting bracket with the pincers at one side of the wipers shown in perspective and their supporting levers in elevation;

Fig. 9 is a detail showing one of the pincers in side elevation;

Fig. 10 is an enlarged detail showing the levers for carrying and operating the pincers, in transverse section and in position upon their support above the wipers;

Fig. 11 is a plan view of the levers with parts broken away to show the construction;

Fig. 12 is a detail showing a front elevation of the pincers in operative position;

Fig. 13 is an enlarged detail of the wipers and adjustable stops therefor illustrating their operation;

Fig. 14 is a plan view of the wipers and their adjacent parts and showing the stops for the wipers;

Fig. 15 is a detail similar to Fig. 13 illustrating the normal operation of the wipers and their adjustable stops;

Fig. 16 is a detail of the presser foot and its operating lever, and the insole toe presser and operating lever;

Fig. 17 is a vertical section through the driving clutch and stop mechanism;

Fig. 18, a side elevation of the stop mechanism;

Fig. 19 is a view similar to Fig. 5 and showing a modified construction;

Fig. 20 is a detail of the cam for closing the wipers in the construction shown in Fig. 19; and Figs. 21, 22, 23, 24, 25, 26, 27, 28 and 29 are details of the several operating cams.

As shown in the drawings, 1 is a suitable supporting pedestal having a plate or table 2 upon which two like supporting frames 3 are secured, said frames being provided with bearings for a transverse driving shaft 4, a counter shaft 5 and a cam shaft 6. Mounted upon one end of the driving shaft 4 to turn freely thereon, is a belt pulley 7 having an internal clutch face adapted to be engaged by a cone clutch wheel 8 mounted upon the shaft to slide longitudinally thereof and operatively connected thereto to turn therewith. A spring 9 (see Fig. 17) interposed between the pulley and wheel normally holds the clutch inoperative, and to move said clutch wheel into engagement with the pulley against the action of said spring, a bar 10 is guided to move longitudinally in a vertical position by a slot therein through which the shaft 4 extends and by a forked upper end embracing the shaft 6. An outwardly projecting portion 11 on said bar around the upper ends of said slot therein for the shaft 4, has an inclined or cam face to engage a similarly formed face upon one end of a collar 12 on the shaft interposed between said bar 10 and the adjacent end of the hub of the clutch wheel. A pin 13 on the bar engages a slot in a downwardly extending lug on the collar to hold said collar from turning upon the shaft and a coiled spring 14 attached at one end to the bar and at its opposite end to the frame 3, normally holds the bar raised, the bar being moved downward against the action of said spring to bring its cam projection 11 into engagement with the collar and force the same outwardly to move the clutch wheel into operative position, by a rod 15 pivotally attached to its lower end which rod may be operated in any suitable manner, as by a foot pedal (not shown). The machine will be driven by the belt pulley 7 as long as the bar 10 is held lowered and will stop immediately upon the release of said bar and the raising of the same by its spring 14.

To insure the stopping of the machine with its parts in certain positions and to hold the same in the position in which they are stopped, a disk or stop plate 16 is secured upon the end of the cam shaft 6 outside of the bar 10. This disk is formed with any desired number of notches 17 in its periphery adapted to be engaged by a roller stud 18 on the bar 10 when said bar is released by the operator. Those notches are so positioned relative to cams, hereinafter described, secured upon the cam shaft; that upon release of the bar 10, the roller stud, riding upon the periphery of said disk will drop into one of said notches and positively stop and lock the cam shaft with the parts of the mechanism operated by the cams, in exactly the desired position. Any desired number of these notches may be provided to stop the machine at any desired point in the revolution of its cam shaft, and if the operator wishes a continuous operation of the machine, it is only necessary that he hold the bar to prevent the roll from engaging the notches.

Motion is transmitted from the driving shaft 4 to the counter-shaft 5 by gears 19 and from the countershaft to the cam shaft 6 by gears 20, the speed being reduced thereby to drive the cam shaft at a slow speed.

Secured to the frames 3 at their forward side is a bracket 21 having a longitudinal opening therethrough to receive a bar 22 which is square in cross-section where it passes through said bracket and is free to slide longitudinally therein. A rear end portion of the bar is also formed square in cross section to slide in a bearing therefor in a member 23 extending across between the frames, and the bar is preferably made in two parts connected by a coupling sleeve 24 engaging the adjacent screwthreaded ends of the two parts and serving as a turn buckle by means of which the effective length of the bar may be changed. A roller 25 on the rear end of said bar engages a cam groove in a cam wheel 26 on the shaft 6 and a coiled spring 27 is sleeved on the bar forward of the bearing member 23, between said member and an adjustable collar 28 on the bar to normally hold the bar projected forwardly with said roller against the outer wall of the groove. As shown in Fig. 24, portions of said groove are wider than the diameter of the roller, and thus when said roller is in those portions of the groove, the bar may be moved rearwardly a short distance against the action of said spring 27.

Mounted upon the rounded forward end of the push bar 22 to turn thereon is a head 29 held in place upon the bar by a pin 30 fast in the bar and engaging a transverse slot in the head. Laterally extending flanges 31 on the head form between them a transverse horizontally extending and forwardly open slot to receive wiper-carrying plates 32 which carrying plates are in turn formed in their forward edge with a slot to receive wiper plates 33. These wiper plates are pivotally connected by a pin 34 and are provided with the usual formed forward edge to engage the heel or toe of a boot or shoe, wiper plates having an edge formed according to the work to be done and approximating the outline of the heel or toe of the last, being placed in the slots of the carrier plates 32 and secured therein to move therewith, by pins 35. The formed edge of the wiper plates is beveled in the usual manner and the adjacent curved edges of the carrier plates are also beveled so as not to hinder the operation of the other parts of the machine. The carrier plates 32 are held within the slot in the carrier head 29 formed between the flanges thereon, by pins 36 secured in the flanges and provided with roller sleeves engaging curved slots 37 in the plates. These slots are curved concentrically with the axis of the pivot 34 of the wiper plates so that said carrier plates may turn freely to open and close the wiper plates, and to so actuate the carrier plates, each is provided with a laterally extending lug having a vertical opening to receive the shank of an eye bolt 38 which turns freely therein and is provided with a horizontally extending screwthreaded opening in its head to receive a screwthreaded rod 39. Each rod is formed with an enlarged rear end (see Figs. 4 and 5) forming a shoulder 40 and is provided with a head 41 to engage the head of an eye bolt 42 through which the rod extends, said eye bolts forming pivotal connections for the rear ends of the rods to the ends of an equalizing cross bar 43. The shanks of the eye bolts extend upwardly through and turn freely within the holes in the ends of the bar and the rods are adapted to turn in and slide freely through the heads of the eyebolts, thus providing a universal joint connection between the rear ends of said rods 39 and said cross bar.

A milled head 44 is secured to the forward end of each rod 39 by means of which the rod may be turned to adjust the same through the eyebolt 38, and a heavy coiled spring 45 is sleeved on the rod between an adjustable collar 46 having screwthreaded engagement with the rod and a collar 47 free to slide longitudinally on the rod and normally held by said spring in engagement with the shoulder 40. The collar 47 is externally screw-threaded to receive an internally screwthreaded sleeve member 48 and a second coiled spring 49 which is of considerably less strength than the spring 45, is sleeved upon the enlarged portion of the rod between said sleeve 48 and the eyebolt 42 through which said portion of the rod is adapted to slide.

A push bar 50 having a forked head 51 connected to the forward end of the bar to rotate freely thereon (see Figs. 5 and 8) embraces the cross bar 43 and is pivotally attached to said cross bar intermediate the ends thereof, by a bolt passing through said forked end and bar, and a flat spring 52 secured to said bar 50 intermediate its ends engages the cross bar at its ends to normally hold said cross bar in a position substantially at right angles to the push bar. The push bar is preferably made adjustable in length by forming the same in two parts having screwthreaded adjacent ends to engage a coupling sleeve or turn buckle 53, and upon the rear end of said push bar is a roller 54 to engage a cam groove in a cam wheel 55 secured upon the cam shaft 6.

In this construction, the wipers are rigidly supported against vertical movement by the carrier head 29 and are given a forward and rearward movement by the longitudinal movement of the push bar 22 sliding through the supporting bracket 21. Said push bar is yieldingly held in its forward position by the spring 27, the cam groove on the cam 26 being wider than the diameter of the roller on the bar to permit the bar to move a limited distance rearwardly independently of the cam which operates to move the wipers rearwardly against the action of said spring. The wipers are thus yieldingly forced longitudinally into engagement with the heel or toe of a last when the roller is in the wide portions of the cam and are positively moved rearwardly when said roller is in those portions of the cam slot which fit the roller. The wipers are therefore yieldingly pressed against the end of the shoe when moved into engagement therewith and variations in the thicknesses of the leather at the point of the toe or heel of different boots or shoes operated upon, is thus provided for by the spring 27 which will yield when a resistance due to the increased thickness of the leather, is offered which is greater than the tension of the spring, said tension being decreased or increased by means of the adjustable collar 28 to give the desired wiping effect.

The wiper closing cam 55 is so set in relation to the wiper reciprocating cam 26 that the wipers will be closed upon the heel or toe of the last as seen as they are moved forwardly, and owing to the interposition of the springs 49 between the eyebolts 42 and the sleeves 48, they will be yieldingly closed, said springs yielding and permitting the rods to move through the eyebolts. When the resistance to the closing of the wipers is sufficient, the springs 49 will be fully compressed or closed, and further pressure will then come upon the springs 45 which are of such strength that they will yield only after the closing of the springs 49, the collar 47 and sleeve 48 being forced to slide longitudinally of the rod against the action of the spring 45 by the pressure of the eyebolts 42 upon the closed springs. The wipers are thus closed by a varying spring pressure upon the work, the springs 49 forcing the wipers inwardly against the shoe upper below the sole with a comparatively light yielding pressure, and the springs 45 closing the wipers over the edges of the shoe sole with a heavy yielding pressure. The equalizing bar 43 and the jointed connection between it and the carrier plates 32, permit said wiper plates to freely adjust themselves to the work, said carrier plates turning together or independently of each other about the common center of the wiper plates to conform to the swing of the last, and said equalizing bar also serves to equalize the pressure of the wipers upon the sides of the heel or toe, thus providing for differences in the thickness of the leather at the two sides of the shoe and giving together with the yielding forward movement of the wipers an even smooth yielding wiping action all around the toe or heel of the shoe.

In Fig. 19 a modification in the closing mechanism for the wiper-carrying plates is shown. Solid straight externally screwthreaded rods 92 engage the eyebolts 38 near their forward ends and at the rear ends extend through the eyebolts 42 to turn freely therein. Said rods are held against longitudinal movement through the eyebolts 42 by means of collars 93 and nuts 94 on the rods engaging the heads of said eyebolts. These rods thus form unyielding connections between the carrier plates and the ends of the equalizing bar so that said plates will be positively moved when the push-bar 50 is actuated by the cam-wheel 95 shown in Fig.

20. In the operation of a machine embodying this construction, after the wipers have been moved bodily forward by the cam 26, they are closed upon the heel or toe of the last by turning the rods 92 by hand, and are given a closing movement to project them over the edge of the sole and form down the shoe upper by the cam 95 which is arranged to close the wipers positively a fixed distance each time, thus obviating the liability of the wipers being projected too far over the edges of the last and destroying the shoulder of an insole thereon.

The downward pressure of the wiper plates upon the work along each side of the last, is equalized as said plates are forced over the edges of the shoe sole upon the last to form the edge of the shoe upper down hard thereon, by the free turning of the wiper head 29 upon its bar 22, said turning being limited by the pin 30 in its slot and also by shoulders 56 (see Fig. 7) formed on the bracket 21 at each side thereof adapted to be engaged by a projecting portion of the head. When the leather is thicker at one side of the last than at the other, as for instance, when the upper and box are misplaced upon the last as illustrated in Fig. 13, the head will tilt, conforming to the differences in thickness of the leather at the two sides of the shoe, and thus the two edges of the last will be subjected to the same pressure, and injury to the shoe or undue strain upon the wipers and their support will be avoided.

When the wiper head is moved rearwardly, bringing the wipers into inoperative position for the discharge of the last and the reception of another, the head, provided it has been tilted during the last operation, is again brought into a horizontal position by a spring arm 57 (Figs. 4 and 7) secured at one end to the bracket 21 and engaging near its opposite end an eyebolt 58 carried by the head 29. The wipers are thus yieldingly held in the proper horizontal position to engage a last.

The last with a boot or shoe thereon, is supported from below in position for lasting, by a jack comprising a vertically movable post 59 provided with a detachable head 60 and guided in guide bearings on a frame 61 guided to slide vertically in guideways on a supporting bracket 62 secured to the forward edge of the table 2. The lower guide bearing for the post is internally screwthreaded to receive an externally screwthreaded sleeve 63 on the post, and between the upper end of this sleeve and a collar 64 adjustably secured upon the post is a coiled spring 65 sleeved upon the post. The height of the post is regulated by the position of the collar 64 which abuts the upper guide bearing for the post and limits its upward movement. The post is thus yieldingly supported by the spring, the tension of which is regulated by adjusting the sleeve 63, and forms a yielding support for the last.

The jack is raised and lowered bodily to raise and lower the last during the lasting operation and to release the same, by a lever 66 pivoted at 67 upon downwardly extending arms on the frames 3, the forward end of said lever being connected by a link 68 to the vertically sliding frame 61. The rear end of the lever is curved and extended upwardly and provided with a roller 69 at its extreme end to engage the periphery of a cam 70 secured upon the cam shaft 6. The lever 66 is held turned with its roller in engagement with the cam by means of a spring 71 attached to the forward end of said lever.

When in place within the machine, the last is clamped between the jack at the lower side and a hold-down 72 engaging the shoe sole upon the last at about the longitudinal center line of the last, said hold-down being oval shape in plan view and provided with sharp projections or teeth on its under side to engage the sole. This hold-down is attached to the lower end of a post 73 which is adjustably held within an opening in the forward end of a lever 74, by a set screw 75. The lever 74 is U-shape in plan view, its two side arms being pivoted to the two frames 3 at 76 and one of said arms being extended rearwardly. To this rearwardly extending end 77 of the lever is pivotally attached a tail piece 78 having a forked portion embracing said end and provided with a roller 79 on its downwardly curved end to engage a cam 80. The rock lever is held turned with said roller in contact with the cam, by a coiled spring 81 attached at its lower end to a cross bar on the frames 3 and at its upper end to the rear end of an extension bar 82 secured to the arm 77 of the lever. The tail piece 78 is turned upon its pivot to adjust the same relative to the rock-bar and yieldingly held in its adjusted position by providing a screw threaded opening in the arm 77 to receive a screw threaded rod 83 (Fig. 16) which is provided with a hand wheel 84 upon its upper end for turning said rod, and which rod extends downwardly through an opening in a cross-bar 85 connecting the sides of the forked end of the tail piece 78 beneath said arm 77. A fixed collar 86 on the rod engages the upper side of said cross-bar and a cap 87 sleeved on the rod is held in contact with its lower side by a coiled spring 88 sleeved on an enlarged lower end of the rod with its lower end in engagement with a nut 89 thereon, which nut may be turned to change the tension of said spring. The enlarged portion of the rod fits and is adapted to slide within an enlarged end of the bore of the cap which enlargement of the bore forms an internal shoulder 90 on the cap to oppose a similar shoulder 91 formed on the rod by said enlargement.

When the lever 74 is rocked by its cam to force downwardly the hold-down hard upon the shoe sole and clamp the last, the spring 88 will yield when the hold-down meets a greater resistance than the strength of the spring and the tail-piece will be turned until the shoulder 90 on the cap engages the shoulder on the rod and the lever will then act as a rigid bar to positively force the hold-down downwardly. During the lasting operation, the wipers are forced over the edge of the shoe sole upon the last and press the last downwardly against the tension of the jack spring 65. The spring 88 in compression between the tail-piece and rear end of the lever, causes the hold-down to follow up the last as it is forced downwardly by the wipers, and thus firmly holds the last in place on the jack against the thrust of the wipers. By turning the hand wheel 84, the collar 86 is raised or lowered and the tail-piece adjusted relatively to the lever 74 to change the position to which the holddown will be lowered, and to provide for lasts of different sizes or changes in the kinds of shoes operated upon.

The hold-down 72 is pivotally attached to the post 73 by providing a gear segment 96 on the foot and pivoting the segment between downwardly extending ears 97 on the post. A worm 98 mounted in bearings in the post and in engagement with the gear segment is adapted to be turned to move the segment and tilt the holddown in the direction of its length. In lasting certain styles of shoes, a heavy clamping pressure is required adjacent to the point or end of the sole, while other styles require a heavy pressure at a distance from the point, and thus by tilting the holddown by means of the worm, the pressure may be brought at the desired point. In placing the last in the machine, the holddown assists in properly locating and positioning the same, serving as a rest against which the shoe sole on the last is placed and a guide to give the proper inclination to the last.

Secured within a transverse opening in the holddown 72 is a spindle 132 which is screw threaded at its ends to receive two milled thumb nuts or heads 133 which may be adjusted toward and from the sides of the foot by turning the same. The lower edges of these heads lie close to the upper surface of the sole of the shoe on the last when the last is clamped between the holddown and jack and they serve as stop members to limit the movement of the wiper plates over the edges of the sole, said stop members being adjusted outwardly into engagement with the inner sides of the upstanding lip of the insole, as shown in Figs. 13—14 and 15 when a shoe having such a sole is being lasted.

When the machine is used to last the toe portion of a shoe, the last upon which the shoe is secured is clamped between the head 60 of the jack and the holddown 72, and to guard against any possibility of the last being displaced by the wipers as they are forced forward and over the shoe sole, a heel member 99 is carried by a swinging bracket 100 pivotally attached to forwardly extending ears 101 on the forward end of the rock-lever 74. This heel member comprises a downwardly extending blade or seat portion curved to conform substantially to the form of the end of the heel portion of a last and a shank 102 extending upwardly from the blades. The bracket for supporting the heel member comprises a socket or eye on the end of a longitudinally extending rod 103 to receive the shank 102 and in which eye it is adjustably secured by a thumb screw 104, said rod being likewise adjustably held by a thumb screw 105 in a bearing or socket on the lower end of a two-part post which is pivotally supported at its upper end between the ears 101 by a pivot rod 106 to which it is secured. The upper member 107 of the two part post is formed with an axial bore to receive a stud bolt 108 on the lower member 109, and a coiled spring 110 sleeved upon the upper end of the bolt is put under compression between the upper end of the upper member 107 and a nut or head 111 upon the screwthreaded upper end of the bolt, which nut may be turned upon the bolt to adjust the tension of the spring. The spring thus holds the adjacent ends of the two parts of the post in frictional contact and the heel member 99 may be swung laterally into position to engage the heel of a last, the lower member of the post turning upon the upper member.

Secured upon one end of the pivot rod 106 is a rearwardly extending arm 112 and a coiled spring 113 on the opposite end of said rod normally holds the rod turned with the bracket 100 swung upwardly and forwardly in position to permit the insertion of a last in the machine, and also normally holds the arm 112 in contact with the upper edge of the side arm 114 of the lever 74. To turn the bracket 100 and lock the same with the heel member in engagement with the heel of a last, a flanged roller 115 is arranged to run beneath the arm 112 upon the side arm 114, said roller acting as a wedge to lift the arm, swinging and pressing the heel member firmly against the heel of the last and locking the same in engagement therewith. The roller is journaled within the forked end of a bar 116 which is pivotally attached at its rear end to a lever 117 secured at its lower end to a stub shaft 118 journaled in a bearing upon the frame 3 and extending therethrough. To the inner end of said shaft is secured a rearwardly extending lever 119 carrying a roller 120 at its rear end to engage a cam wheel 121 on the cam shaft 6. A coiled spring 122 (Fig. 3) sleeved upon the outer end of the shaft 118 holds the levers turned with the roll in contact with its cam, and a flat spring 123 (Figs. 2 and 3) secured at one end to the upper end of the lever 117 engages the bar 116 at its free end to hold the roller 115 down upon the arm 114 which forms a track therefor.

In placing a last with a shoe thereon in position for lasting, the operator will turn the bracket 100 by hand to bring the heel member into proper engagement with the heel of the shoe, and the cam wheel 121 will then at the proper time permit the spring 122 to turn the levers and move the roller 115 beneath the raised end of the bracket arm 112. The spring thus operates to move the roller beneath the lever and positively to lock the heel member in the position to which it is turned by the operator, said roller also operating as a wedge to turn the bracket and force the heel member firmly against the shoe heel where it is held locked until the cam 121 turns the levers against the action of said spring and retracts the roll from beneath the bracket arm.

To hold the edge of the sole of a shoe at its end, down upon the last against being "wiped up" and turned back by the wipers during the lasting operation, a presser-finger 124 is provided. This presser-finger comprises a member having a thin lower edge to engage the shoe sole close to its edge at the extreme end of the last, said edge being curved to conform to the outline of the sole, and also provided with a socket in its upper end to receive the lower end of a post 125 adjustably and pivotally attached to the forward end of an arm 126 which is pivotally mounted intermediate its ends to turn upon a transverse shaft 127 fixed in suitable bearings therefor on the frames 3. The rear end of the arm 126 is provided with a roller 128 to engage a cam wheel 129 secured upon the cam shaft 6 and operating to rock the bar and raise and lower the presser finger in timed relation to the movement of the wipers. The arm is held turned with its roller in engagement with the cam by a coiled spring 130 (Fig. 2) secured at its lower end to a cross-bar on the frames 3 and at its upper end to a bar 131 secured to and forming an extension of the rocker-bar.

The forward end of the arm 126 is forked and provided with bearings for laterally extending trunnions 134 (see Figs. 2, 3 and 16) on the head 135 of a lever 136 adapted to turn upon said trunnions within the forked end of the rocker-bar. The head 135 is formed with a vertical bore which is enlarged and formed square in cross-section at its lower end and internally screwthreaded at its upper end to receive a screwthreaded sleeve 137 (Fig. 16) on a reduced upper end of the post 125, held in place to turn freely thereon between a collar 138 on the upper end of the post and a collar 139 fixed on the post within the enlarged lower end of the bore of the head. The collar 139 forms a guide for the post within the head to prevent the post from turning therein and said post is raised or lowered relative to the head by turning the sleeve 137, a quick vertical adjustment being thus provided for the presser-finger. The member 124 is made quickly detachable from the post by providing a flat spring 140 secured at one end to the post and carrying a pin 141 at its lower end to engage an opening in the socket end of the member and a corresponding opening in the post. The member may thus be quickly detached and another having a different form put in its place when there is a radical change in the shape of the shoes being lasted. The lever 136 is adjusted to swing the presser finger and locate the member 124 in proper relation to the presser foot 72 and is yieldingly held in its adjusted position by a rod 142 pivotally attached at its lower end to the arm 126 and having a screwthreaded end extending upward through an opening in the end of the lever where it is provided with a thumb nut 143 engaging the upper side of the lever. A coiled spring 144 is sleeved on said rod between the lever 136 and the arm 126 to normally hold the lever against the nut 143 which may be turned on the rod to swing the lever on its trunnions and adjust the presser-finger toward or from the presser-foot. If in the operation of lasting a shoe, the wipers should strike the sole engaging member, it will be swung forwardly thereby, its carrying lever 136 turning against the action of the spring 144.

To stretch the shoe upper up around the toe or heel of a last and spread the same during the lasting operation, a series of pincers 145 are provided, each comprising a fixed jaw 146 having a vertically extending shank portion 147 secured at its upper end within an opening in a carrying bar 148, and movable upwardly therethrough to a limited extent, there being two of these carrying bars, one at each side and a considerable distance above the wipers to carry all of the pincers at that side. Each of the pincers further comprises a movable jaw 149 which is pivotally attached at its upper end to a collar 150 free to slide upon the shank 147 and is carried by a lever 151 pivotally attached at one end to the movable jaw intermediate the ends of said jaw, said lever being pivotally secured intermediate its ends to the fixed jaw to turn thereon and raise and lower the movable jaw. A rod 152 is pivotally connected at its lower end to the outer end of each lever 151 and this rod extends freely upward through an opening in an actuating bar 153 and is screwthreaded at its upper end to receive a thumb nut 154. Sleeved upon each rod 152 between said nut 154 and the upper side of the bar 153 is a coiled spring 155 and a collar 156 fixed on said rod below said bar limits the upward movement of the rod through the bar. An upward movement of the bar 153 relative to the bar 148 will turn the lever 151 and will swing and slide the movable jaw downwardly into clamping position to clamp the projecting upper edge of the shoe upper between its laterally extended lower end which has a gripping face, and a similar lower end on the fixed jaw. By attaching the movable jaw to the fixed jaw by means of the sliding collar 150, the movable jaw may be carried bodily upward by the lever 151 and at the same time swung away from the fixed jaw to receive the edge of the shoe upper. A wide opening between the jaws is thus secured with but a comparatively short swing of the movable jaw and the said jaws may grip the shoe upper well down at the side of and close to the last without the movable jaw striking the edge of the last or shoe sole in closing. By providing the springs 155, the jaws are yieldingly closed and the gripping force of the jaws is determined by the tension of said springs which tension may be readily changed by turning the thumb nuts 154 and regulated so that the upper will be held with just sufficient force to stretch the same up around the last and so that it will be gradually pulled from between the jaws without injury to the leather as the last is lowered to stretch and updraw the leather and also as the wipers force it over and down upon the edge of the shoe sole as later explained.

Figure 2:
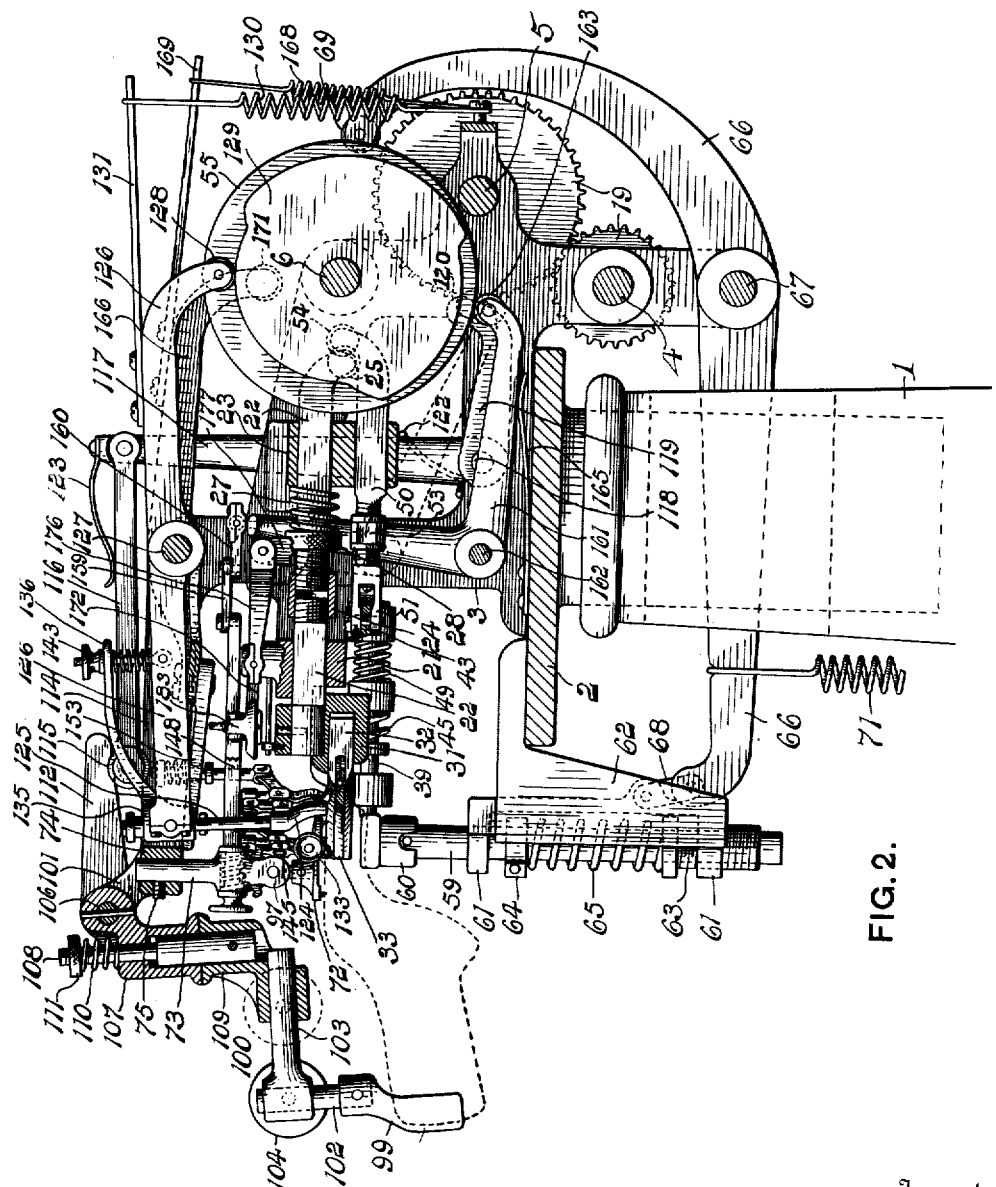

Upon the fixed jaw of the forward pincers (Fig. 12) at each side of the last, is a downwardly extending lug forming a support for a roller 157 adapted to engage the side of the shoe upper upon the last at a distance below the sole and to thus form a guide for locating the pincers about the last in position to receive and grip the shoe upper, the carrying bars 148 being pivotally supported at 158 to turn inwardly toward the sides of the last and bring said rollers into engagement with the sides thereof after the last with a shoe thereon has been secured in position for lasting by the jack and presser foot. The carrying bars are extended rearwardly beyond their pivotal support, and to these rearwardly extending ends are pivotally attached links 159 pivotally connected together at their opposite ends on the forward end of a bar 160 which in turn is connected at its rear end by a ball and socket joint to the upper end of a bell crank lever 161 pivoted at 162 to the frame and provided at the end of its rearwardly extending arm with a roller 163 to engage the periphery of a cam wheel 164 secured upon the cam shaft 6. A flat spring 165 shown in Fig. 2, is secured to the table 2 and presses upward on the rearwardly extending arm of the lever 161 to hold the roller 163 in contact with its cam and to yieldingly swing, through the medium of the bar 160 and links 159, the carrying bars toward the sides of the last and yieldingly hold the rolls 157 against the side of the last. The universal joint connection between the upper end of the lever 161 and the bar 160, and the link connection of the forward end of said bar to the rear ends of the carrying bars, permits of the free turning of said carrying bars independently of each other and the accurate adjustment of the pincers to the work, the closing pressure of the spring 165 being also equalized between said bars to hold the pincers at each side of the last pressed toward the shoe with equal force. The described pincer mechanism, per se, forms the subject-matter of a divisional application, Serial No. 200,607, filed November 6, 1917.

A rock arm 166 is mounted intermediate its ends to turn freely upon the fixed shaft 127 and to the forward laterally enlarged end of this arm are pivoted at 167 (Figs. 3 and 8) the rear ends of the actuating bars 153 to turn on said pivots with the carrying bars 148 and to be raised and lowered by said member when the same is rocked on the shaft 127 by a coiled spring 168, shown in Fig. 3, attached at its lower end to a cross bar on the frame, and at its upper end to a bar 169 secured to and forming a rearward extension of the rocker, the rocking movement of said member and the consequent opening and closing of the jaws of the pincers, being controlled by a cam wheel 170 on the cam shaft 6 upon which cam rides a roller 171 on the rear end of the rocker member. The pincers are thus actuated by the cam wheel 170 in timed relation to the movement of the wipers to grip the edge of the shoe upper and to stretch it up around the last.

A pivoted or horizontally swinging support is provided for each of the carrying bars 148 comprising a member 172 pivotally supported at 173 upon bearings provided therefor upon the upper side of the bracket 21 (Fig. 1), the pivots 158 upon which said bars 148 turn, being located in the forward ends of said members. Each member is formed with an integral gear segment 174 (see Figs. 8, 10 and 11) meshing with the segment on the other member so that said members are caused to turn together in opposite directions, and one of the members is formed with a laterally extending arm 175 to the outer end of which a rod 176 is attached by a universal joint connection, the rear end of said rod being pivotally attached to the upper end of a bell crank 177 pivoted upon a stub-shaft 178 (Fig. 1) having a bearing in the frame 3 and provided at its rear end with a roller 179 to engage a camwheel 180 secured upon the cam shaft 6. A spring 181 (see Fig. 1) coiled upon the outer projecting end of the stub-shaft 178 engages beneath the rearwardly extending arm of the lever 177 and exerts a force to hold said roller 179 in contact with said cam. Said lever is thus positively actuated by the cam 180 to turn the supporting members 172 a determinate distance upon their pivots 173 and in order that the carrying bars 148 may be moved bodily with said supporting members about the axes of said pivots, to swing the pincers at each side of the last laterally away from the last and in a direction which is substantially radial to the end of the last, the bars 148 are automatically locked to their supporting members 172 to turn therewith, by forming each member with an integral ratchet 182 adapted to be engaged by a pawl 183 having a segmental face to engage and lock with the ratchet. Each pawl is pivoted between laterally extending ears on the carrying bars 148 upon pivot pins 184 and is normally held in engagement with its ratchet by a spring 185 coiled at its ends around the pivot pin and engaging the pawl intermediate its ends. An upwardly extending tail piece 186 on each pawl is adapted to be engaged by the actuating bar 153 (Fig. 10) when the same descends to open the jaws of the pincers. As soon as the cam 170 operates to rock the rocker member 166 and raise the bars 153 to close the jaws upon the work, the pawls 183 are released and come into engagement with their ratchets, thus locking the carrying bars to the pivoted supporting members 172 to turn therewith and holding the same locked until the actuating bars are again lowered at the end of the lasting operation to open the jaws for the reception of another shoe.

The pincers are automatically adjusted relatively to the sides of the last to position themselves to engage the edge of the shoe upper projecting above the insole by the initial inward swinging movement of the carrying bars 148, the spring 165, (Fig. 2) holding these bars with the rollers 157 in contact with the sides of the shoe. After the closing of the pincers upon the stock and during the lasting operation, the pincers are moved bodily and laterally away from the opposite sides of the last in divergent directions from the median line of the end of the shoe, or, in other words, are moved diagonally outwardly and forwardly in the direction of the end of the shoe with their jaws gripping the edge of the shoe upper to spread and stretch the leather and eliminate all wrinkles. The danger of spreading and stretching the upper of a shoe having a narrow heel or toe, too much, and of not stretching the stock on a broad heel or toe far enough to eliminate the wrinkles, is thus obviated as the pincers are first adjusted to the particular shoe being lasted and then moved by a separate cam a determinate distance every time to subject the shoe upper to the same spreading and stretching action regardless of the size or shape of the heel or toe. The direction of outward movement of the pincers is important, particularly in lasting toes, since by outward pull along lines diagonally forward toward the end of the last, the upper is centered on the toe and is uniformly tensioned so that the wipers can exert uniform molding pressure on the tensioned upper.

When the machine is in open position to receive a last with a boot or shoe upper in place thereon for lasting as shown in Fig. 1, the jack cam is at the extreme lower end of its movement, the roller 69 being in contact with the innermost run of the jack cam, as shown in Fig. 28; the hold-down is raised to the limit of its movement, the roller 79 being in contact with the inner run of the cam 80, as shown in Fig. 29; the presser finger is also fully raised, the roller 128 engaging the inner run of the cam 129, as shown in Fig. 26; and the heel member is swung upwardly, its locking roller 115 being moved rearwardly by the engagement of the roller 120 with the high part of the cam 121, as shown in Fig. 21. With the parts in these positions, the operator may insert a last with a shoe upper in place thereon for lasting, by placing the sole against the hold-down with the toe portion adjacent to or against the formed edges of the wiper plates which are held moved rearwardly by the engagement of the roller 25 with the inner run of the cam groove in cam 26, and also held in open position by the engagement of the roller 54 with the inner run of the cam groove in cam 55, as shown in Figs. 24 and 25. When the last is so placed, the upstanding edge of the shoe upper will project between the jaws of the pincers which are held open by the spring 168 acting on the rocker bar 166 to hold the roller 171 in contact with the cam 170, as shown in Fig. 23 and the actuating bar 153 in lowered position.

The operator will then swing the bracket 100 by placing his hand thereon, to bring the heel member 99 into engagement with the shoe heel on the last. He will then start the machine by placing his foot upon a treadle, or other means for moving the bar 10 and throwing the clutch 8 into engagement with the driving pulley. By the first movement imparted to the cam shaft 6, or during the turning of the cams from starting position indicated at *a* in Figs. 21 to 29 inclusive, to *b*, the jack is raised and the presser foot is simultaneously lowered to clamp the last between them. The locking roller 115 is at the same time moved forwardly to lock the heel member in position and the cam 164 is turned, permitting the spring 165 to act upon the lever 161 and close the carrying bars inward, adjusting the pincers to the sides of the last. The cam 170 is so set in relation to cam 164 that immediately upon the engagement of the roller 157 on the pincers with the sides of the last, said cam will operate to cause the actuating bars 153 to be raised and close the jaws of the pincers upon the upstanding edge of the shoe upper and firmly grip and tension the same.

During the further turning of the cams from position *b* to position *c* the cam 129 operates to lower the presser finger into engagement with the shoe sole on the last at its toe portion outside of the lip of the sole, and cams 26 and 55 operate respectively to move the wipers forward into engagement with the shoe upper some distance below the sole of the last and to close said wipers around the toe. When the shaft is turned to position *c*, the roller stud 18 will drop into the second notch in the stop plate 16 provided the bar 10 is not held down by the operator, and the machine will be automatically stopped to give the operator an opportunity to examine the work. In turning from position *b*, the roller 25 moves into a portion of the cam slot which is wider than the diameter of the roller giving said roller horizontal play therein, and the wipers are thus yieldingly engaged with the point of the toe and if the operator in placing the last in the machine should position it upon the jack too close to the wipers to permit their full forward movement without moving the last upon the jack, the spring 27 will yield and thus prevent injury to the shoe. Variations in the thickness of the leather is also provided for by the yielding forward movement of the wipers and the yielding closing movement secured by means of the springs 45 and 49 provides for variations in the thickness of the leather at the sides of the toe and lasts of different swings or shapes. By turning the screws 39 either or both of the wiper plates may be adjusted to conform to lasts of different swings and sizes.

The enlargement in the width of the cam slot is important in that it permits the wipers bodily to be displaced rearwardly by the incline of the toe end during upwiping movement so that the roll 25 is spaced from the controlling edge of the cam slot when the plane of the sole is reached in the upwiping movement. When this point is reached the spring 27 will instantly impel the wipers over the edge of the sole independently of their operating member or controlling cam. Simultaneously, the yielding springs 45 and 49 in the wiper closing means, which have been compressed in closing the wipers against the sides of the toe preparatory to and during the upwipe, will instantly snap or impel the wipers over the sides of the toe end of the sole independently of and without waiting for their nonyielding actuator,—the cam 55—, to act. This provision is advantageous in that it enables tighter toe lasting to be accomplished than would be obtained if the wipers waited to close, as they do in all prior machines known to me, until they have been raised to a predetermined level.

This spring impelled movement of the wipers over the edge of the sole independently of their actuating or operating means can not injure the sewing rib of the sole since the stop members 133 back up the sewing rib at the sides of the toe. In some cases it may be desirable to back up the sewing rib at the end of the toe and in such cases the nut 143 (Fig. 16) can be adjusted to move the presser finger from a position just outside the rib to a position inside of and against the rib. Ordinarily, the positive limitation of forward closing over movement afforded by the controlling edge of cam 26 will have the described function but the operator may, obviously, utilize the presser finger as described.

During the turning of the jack cam 70 from position *c* to *g*, the jack is gradually lowered and the hold-down is correspondingly lowered by its cam 80 to force the last with the shoe thereon downward and to cause the wipers to wipe the upper up around and slightly over the bottom of the toe of the last, the edge of the upper being held during this movement by the pincers, to stretch the leather during the wiping up so that the upper is more closely conformed to the last. On the upwiping movement, the convexity of the end of the last may be such that the wipers must yield lengthwise to avoid injury, by scraping, to the upper and the lengthwise bodily yielding movement of the wipers is therefore advantageous in this case also. The presser finger during the turning of its cam from *c* to *g* is lowered in proportion to the downward movement of the last, to hold it down upon the shoe sole and hold the edge of the sole down firmly upon the last to prevent said edge from being wiped up and turned back by the wiper plates when said wipers wipe up the upper below the sole on the last and are projected quickly over the edge of the sole when the plane is reached in which the wipers can advance, by the compressed spring 27, as previously explained. Simultaneously a quick, closing movement is imparted to the wipers by the tensioned springs 45, 49, the cam groove of cam 55 being formed concentric from *c* to *d* to hold the wipers closed under spring tension upon the shoe toe during the wiping up of the toe, and from *d* to *f* being operative to close the wipers partly over the sole edge.

During the turning of the cams 26 and 55 from *f* to *g*, the wipers are retracted and opened out and remain in that position during the turning from *g* to a point between *h* and *i*. Coincidently with the retracting movement of the wipers a rise in holddown cam 80 (see Fig. 29) causes the holddown to press downwardly the last and jack, relieving the pressure of the jack spring against the retracting wipers. When the wipers have so moved away from engagement with the shoe, the jack and presser foot are raised during the turning of the cams from *h* to *i* so that when said wipers are again moved forward and closed during the turning of the cams 26 and 55 from midway between *h* and *i* to the point *i*, said wipers will again engage the shoe upper below the shoe sole and will operate to wipe the shoe upper up around the toe of the last a second time during the second lowering of the jack and hold-down as their cams are turned from *i* to *n*. The presser finger is raised at *h* with the second raising of the last and is gradually lowered with the jack during the turning to position *l* when it is quickly raised to its original or "open" position of the machine to get out of the path of the wipers as they are forced over the edges of the sole and stopped by the stop members 133 from wiping inward over the upstanding lip of the insole. The turning of the cams from position *n* to *a* returns all of the parts to their original or "open" position for the insertion of a second last. During the second advance of the wipers over the edge of the insole and their retraction, the jack spring and holddown are effective to exert compacting pressure against the advancing wipers and to relieve said pressure when the wipers retract, as described in connection with the first wiping operation. By this arrangement the shoe upper is subjected to two wiping operations during the cycle of operation, its upwardly projecting edge being gripped and held by the pincers to stretch the leather, until the final inward movement of the wipers over the edges of the shoe sole.

The cam 180 for turning the carrying members 172 and moving the pincers bodily away from the sides of the last to spread and stretch the shoe upper, remains inoperative during its turning from *a* to *d* with the pincers gripping the edge of the upper. As the wipers start to move forwardly and close over the bottom of the last, said cam operates to move the pincers laterally away from the sides of the shoe with their jaws gripping the edge of the upper, and thus stretch and spread the leather as it is wiped over and down upon the edge of the sole. The pincers are held in the position to which they are turned, during the remainder of the lasting operation or until the wipers again start to move forwardly and close over the edge of the sole, when the cam will permit the carrying members to swing inwardly and cam 170 will operate to open the pincer jaws. Preferably, and substantially as indicated by the cam slots, Figs. 25, 27, 28 and 29, the grippers will begin to swing laterally, inward toward the side of the last and shoe, subsequently to the point (*l*, Fig. 29) when the last and jack reach the limit of lowering upwiping movement so that the wipers will mold the upper to the toe of the last, and over the ridge between the toe and last bottom while the upper is stretched and under tension. Between the points *l* and *m* the wipers begin their advance over the edge of the insole, forcing the edge of the upper downwardly on the insole, against the upward compacting pressure of the jack spring and, as they reach fully closed position ("*o*", Fig. 25), forcing the upper firmly and closely into the corner, between the feather (or bottom) and lip of the insole. As the wipers begin their advance over the edge of the insole, the gripper cam (Fig. 27) swings the grippers laterally inward toward the side of the shoe and the clamping cam (Fig. 23) coincidently operates the grippers to relieve the grip on the upper. The indraw or tension on the upper, as the wipers reach the ridge between the side of the toe and the last bottom just before the grippers swing inwardly and release, causes a heavy tension to be exerted against the upper which is effective to mold the upper tightly and closely over the ridge, and which does not tear the upper since the spring clamping pressure of the grippers will permit the grippers to yield and allow the wipers partially to pull the upper from between the gripping jaws as the wipers advance over the ridge. The inward swinging and releasing movement of the grippers, therefore, occurs after the wipers have molded the upper to the last and have clamped it over the edge of the insole. Consequently, there is no possibility of slack occurring in the tension of the upper while it is being molded and conformed to the last.

Between the points *g* and *h* the jack cam 70 is formed with a slight depression and the hold-down cam 80 with a corresponding projection so that the jack and hold-down will be lowered slightly just at the end of the first wiping operation to permit a securing wire to be drawn in between the wiper plates and the formed over edge of the shoe upper for holding said edge. The third notch in the stop plate 16 is so located relative to the cams, that the machine will be automatically stopped by the engagement of the stud roller 18 with said notch, when said cams have been turned to a point midway between the points *g* and *h* so that the operator may draw the wire into place beneath the wipers and make the same fast to tacks driven into the sole on the last or otherwise secure the wire about the shoe toe. When the third notch and second stop point in the cycle is utilized for this purpose, the subsequent second overwiping movement of the wipers will force the binding wire tightly into the corner between the lip and feather of the insole.

Having thus fully described my invention what I claim is:—

1. In a machine of the character described, the combination of formed wiper plates movably supported to close upon and embrace the end of a shoe upon a last, means for supporting the last with the shoe thereon, means for moving the supporting means and wiper plates relatively to bring the same into wiping contact with the shoe upper below the plane of the sole thereof and to form the upper against the end and over the edge of the sole portion of the last, means for actuating the wiper plates to close the same upon the end of the shoe and over the edge of the sole portion thereof to form and stretch the upper, means for gripping the shoe upper near its edge to pull the upper during the forming and stretching thereof by the wiper plates, and means for actuating the gripping means to engage the same with the shoe upper and to disengage the same therefrom in timed relation to the relative movement of the wiper plates and last supporting means and the closing movement of the wiper plates to stretch the shoe upper.

2. In a machine of the character described, the combination of wiper plates movably supported to close upon the end of a shoe upon the last, means for supporting a last with a shoe thereon, means for moving the supporting means and wiper plates relatively to cause the wiper plates to wipe the upper into contact with the last, means for actuating the wiper plates to close the same upon the end of the shoe and over the edge of the sole thereof to form the upper against the last and over the edge of and down upon a sole upon the last, and grippers for gripping and holding the edge of the upper during the closing movement of the wipers to cause said wipers to wipe out the wrinkles.

3. In a machine of the character described, the combination of wiper plates having formed edges, means for holding a last with a shoe in place thereon for lasting, means for moving the wiper plates and holding means relatively to cause the plates to engage and wipe the shoe upper up around the end of the last, pincers for engaging and pulling the upstanding edge of the shoe upper during the lasting operation, and means for automatically moving said pincers in timed relation to the wiping operation to open and close the same and pull the edge of the upper.

4. In a machine of the character described, the combination of wiper plates having formed edges and supported to move toward and from each other to embrace the end of a shoe upon a last, means for movably supporting the last, grippers to engage the edge of the shoe upper, means for actuating the wiper plates to open and close the same upon the end of the shoe, means for moving the supporting means and wiper plates relatively to cause said plates to upwipe the upper against the end of the last, and means for moving said supporting means and grippers relatively and in timed relation to the opening and closing and wiping movements of the wipers to stretch the upper and cause the wipers to wipe out the wrinkles in the upper.

5. In a machine of the character described, the combination of wiper plates pivotally supported to embrace the end of a shoe upon a last, means for movably supporting the last, means for actuating the plates to close the same upon the shoe, grippers to engage the edge of the shoe upper, means for moving said supporting means in one direction, and means for moving the grippers in a different direction to stretch the upper, said means for moving said supporting means and the means for moving the grippers operating in timed relation to the actuation of said plates.

6. In a machine of the character described, the combination of pivotally supported wiper plates to embrace the end of a shoe upon a last, a jack to support the last, means for clamping the last in place upon the jack, means for actuating the plates to close the same upon the end of the shoe, pincers to engage the edge of the shoe upper, means for bodily moving the pincers away from the last in timed relation to the closing of the plates, and means operating in timed relation to the movement of the pincers to move the jack and clamping means in a direction at an angle to that in which the pincers are moved.

7. In a machine of the character described, the combination of wiper plates supported to close upon and embrace the end of a shoe upon a last, means for supporting the last, means for holding the last in place upon its support, means for moving the plates to close the same upon the end of the shoe, pincers to engage the edge of the shoe upper, means for bodily moving the pincers diagonally outwardly from the curved end of the last in timed relation to the closing of the plates, and means operating in timed relation to the movement of the pincers to move the supporting means for the last in a direction at an angle to that in which the pincers are moved.

8. In a machine of the character described, the combination of wiper plates having formed edges, means for moving said wiper plates forwardly and closing the same upon the end of a boot or shoe upon a last, means for supporting a last with a shoe thereon in place for lasting, means for moving said support and plates relatively to wipe the shoe upper up around the end of the last, pincers for engaging the upstanding edge of the shoe upper, means for automatically closing the pincers upon said edge in timed relation to the movement of the wipers, and means for bodily moving the pincers laterally of the last toward and from the same in timed relation to the movement of the wipers for spreading and stretching the shoe upper.

9. In a machine of the character described, the combination of wiper plates having formed edges, means for closing said wiper plates upon the end of a boot or shoe upon a last, means for supporting a last with a boot or shoe thereon in place for lasting, means for moving said support and plates relatively to wipe the shoe upper up around the end of the last, pincers for engaging the upstanding edge of the shoe upper, means for automatically closing the pincers upon said edge, a swinging member for carrying the pincers, and means for moving the swinging member to bodily move the pincers.

10. In a machine of the character described, the combination of wiper plates adapted to embrace the end of a shoe upon a last, means for actuating said wiper plates, pincers to engage the edge of a shoe upper upon a last, carrying members located at each side of the end of the shoe and adapted to swing to move said pincers toward and from the shoe, and means for swinging said members.

11. In a machine of the character described, the combination of wipers having a continuous formed edge to engage and embrace the end portion of a last, and pulling members adjacent to the sides of the end portion of the last movable toward and from said sides laterally of the last to grip, spread and stretch the upper during the operation of the wipers in wiping the upper against the end of the last and over the sole portion thereof.

12. In a machine of the character described, the combination of means for forming a shoe upper around and against the end of a last, pulling members movable toward and from the sides of the end portion of the last, and means for yieldingly holding said members positioned adjacent to said sides.

13. In a machine of the character described, the combination of wipers having a continuous forming edge to engage a shoe upper and form the same against a last, members to grip the upper near its edge, carrying means for said members, and means for moving said carrying means to move said members transversely of the vertical plane of said edge of the wipers from within the vertical plane of said last to a point outside thereof.

14. In a machine of the character described, the combination of wipers adapted to engage a shoe upon a last at the end portion thereof, means for actuating said wipers, pincers, carrying means for the pincers, means for yieldingly moving the carrying means to bring the pincers into engagement with the sides of the shoe, and means for moving the carrying means against the action of said yielding means.

15. In a machine of the character described, the combination of wiper plates adapted to engage the end of a shoe upon a last, means for actuating said wipers, a plurality of pincers, means for bodily moving said pincers simultaneously toward the last and yieldingly holding the same in the position to which they are moved, and means for moving the pincers away from the last against the action of said yielding means in timed relation to the movement of the wipers.

16. In a machine of the character described, the combination of wipers adapted to embrace the end of a shoe upon an inverted last below the plane of the sole of the shoe and to wipe the upper into contact with the last around said end, means for supporting the last, means for moving the wipers to bring the same into contact with the end of the shoe, means for moving said support and wipers relatively to cause the wipers to upwipe the shoe upper around and against the end of the last, and means for providing a relatively yielding bodily movement of said wipers and last longitudinally of the last when that portion of said wipers which is adjacent to the longitudinal median line of the last is brought into contact with the end of the shoe.

17. In a machine of the character described, the combination of wipers adapted to embrace the end of a shoe upper upon a last and to turn toward each other into contact with the sides of the shoe adjacent to said end, means for supporting the last, means for actuating the wipers to bring the same into contact with the end of the shoe and to close the same upon said end, means for moving said support and wipers relatively to cause the wipers to upwipe the shoe upper around and against the end of the last, and means for permitting a yielding bodily movement of said wipers longitudinally of the last when that portion of said wipers which is adjacent to the longitudinal median line of the last is brought into contact with the end of the shoe.

18. In a machine of the character described, the combination of wiper plates adapted to engage the end of a shoe upon a last, means for supporting the last with a shoe thereon in place for lasting, means adapted to yield in the direction of the length of the last and yieldingly hold the wiper plates against the end of the shoe at substantially the longitudinal median line of said last, and means for positively moving the wiper plates against the action of said yielding means.

19. In a machine of the character described, the combination of wiper plates adapted to embrace the end of a shoe upon a last, means for supporting the last with a shoe thereon in position for lasting, and means for bodily moving the wiper plates toward and from the last comprising a spring operating to normally hold the wiper plates moved bodily into yielding engagement with the extreme end of the shoe and means for moving the wiper plates in the direction of the length of the last bodily away from the end thereof against the action of said spring.

20. In a machine of the character described, the combination of wiper plates having formed edges, means for closing said wiper plates upon the end of a boot or shoe upon a last, means for supporting a last with a boot or shoe upper thereon in place for lasting, means for moving said supporting means in timed relation to the closing of said wiper plates to cause said plates to upwipe the shoe upper, and a reciprocable carrying member for the plates upon which said plates are free to turn upon an axis extending longitudinally of the last.

21. In a machine of the character described, the combination of wiper plates having formed edges to engage the end of a boot or shoe upper upon a last, means for actuating said plates, means for supporting the last in position for lasting comprising members adapted to clamp the toe portion of the last between them, means for moving said supporting means and wiper plates relatively to cause the plates to upwipe the shoe upper, a wiper carrying head, a support for said head upon which said head is free to turn to permit the wipers to tilt, and means for limiting the turning of the head.

22. In a machine of the character described, the combination of wiper plates having formed edges to engage the end of a boot or shoe upper upon a last, means for actuating said plates, means for supporting the last in position for lasting comprising members adapted to clamp the toe portion of the last between them, means for moving said supporting means and wiper plates relatively in timed relation to the other movements of the plates to cause the plates to upwipe the shoe upper, a pivoted support for the wipers adapted to turn to permit the wipers to tilt laterally of the last, and means for yieldingly holding the support against turning.

23. In a machine of the character described, the combination of a series of pincers, carrying members for the pincers adapted to swing toward the sides of a shoe upon a last to bring said pincers into position to engage the edge of the shoe upper, means for moving the carrying members, said carrying members being adapted to turn relative to said means when swung toward the sides of the shoe, and means for locking the said means and said carrying members together to cause said members to move with said means.

24. In a lasting machine, the combination with wipers adapted to engage the end of a shoe upon a last, of a series of pincers, pivoted carrying members, means for yieldingly turning said members to move the pincers toward the sides of the shoe, means movable with said carrying members for moving said members bodily away from the shoe to stretch the upper, and mechanism for positively actuating the said means.

25. In a lasting machine, the combination with wipers adapted to engage the end of a shoe upon a last, of a series of pincers, pivoted carrying members for supporting the pincers at each side of the last adjacent to said shoe end, swinging members to which the carrying members are pivoted and which are operatively connected to turn simultaneously in opposite directions, means for locking said carrying members to said swinging members to turn therewith, and means for actuating the swinging members.

26. In a lasting machine, the combination with wipers adapted to engage the end of a shoe upon a last, of a series of pincers, pivoted carrying members for supporting the pincers at each side of the last adjacent to the end portion thereof, swinging members to which the carrying members are pivotally attached and which are operatively connected to turn simultaneously in opposite directions, means for locking said carrying members to said swinging members to turn therewith, means for actuating the swinging members, and means for actuating the pincers adapted to unlock said locking means when operated to open the pincers.

27. In a lasting machine, the combination with wipers adapted to engage the end of a shoe upon a last in the process of lasting, of a series of pincers to engage and hold the edge of the shoe upper, carrying means adapted to be adjusted toward the sides of the last to bring the pincers into position to engage the shoe upper, actuating means movable with the carrying means for moving the carrying means bodily away from the last, locking means for connecting the carrying and actuating means, and means operating in timed relation to the movement of the actuating means for controlling the locking means.

28. In a lasting machine, the combination with wipers adapted to engage the end of a shoe upon a last in the process of lasting, of a series of pincers having pivoted jaws to engage and hold the edge of the shoe upper, carrying members adapted to be adjusted toward the sides of the last to bring the pincers into position to engage the shoe upper, actuating members movable with the carrying members to move said members away from the last, locking means for connecting the carrying and actuating members, and means for actuating the pincer jaws operating to control the operation of the locking means.

29. In a lasting machine, the combination with wipers adapted to engage the end of a shoe upon a last in the process of lasting, of a series of pincers having pivoted jaws to engage and hold the edge of the shoe upper, carrying members adapted to be adjusted toward the sides of the last to bring the pincers into position to engage the shoe upper, actuating members movable with the carrying members to move said members away from the last, locking means for connecting the carrying and actuating members, means connected to said jaws for actuating the same adapted to engage and operate the locking means, and means for actuating the means for actuating the jaws operating in timed relation to the movement of the carrying members.

30. In a machine of the character described, the combination with wiper plates having formed edges to engage and embrace the end of a shoe upper to form the same over the edge of a shoe sole upon a last, of means for stretching the upper over the side of the last independently of the forming operation, and means for engaging the sole adjacent its edge at the end of the last to hold said edge down upon the last during the operation of the stretching means and before the upper is formed down thereon by the forming means.

31. In a machine of the character described, the combination of wiper plates arranged to embrace the shoe upper at one end of a last, means normally tending to project said wiper plates toward and over the end of the last yieldingly to engage the upstanding marginal portion of the shoe upper at said end of the last, and means for positively controlling the amount of projecting movement of the wipers over the edge of the sole on the last.

32. In a machine of the character described, the combination of wiper plates arranged to embrace the shoe upper at one end of a last, means for projecting the wiper plates toward and over the end of the last comprising means normally tending to project the wiper plates toward and over the end of the last yieldingly to engage and wipe the upstanding edge of the upper down over the edge of a sole on the last, with controlling means permitting determinate projecting movement of the wipers, and means for preventing the projection of the wipers over the sole edge beyond the limit of projecting movement permitted by said controlling means.

33. In a machine of the character described, the combination with wiper plates adapted to engage and wipe a shoe upper upon a last up around the end thereof, and means for actuating the wipers, of means supported independently of said wipers and their actuating means for limiting the inward closing of the wipers over the shoe sole.

34. In a machine of the character described, the combination with pivotally connected wiper plates adapted to embrace the end of a shoe upon a last, means for actuating the wipers to close the same over the edge of a shoe sole upon the last, of means supported over said shoe sole forming a stop to limit the inward closing of the wipers.

35. In a machine of the character described, the combination with a last support, a hold-down to engage a shoe sole upon the last and hold the last upon said support, pivotally connected wipers to embrace the end of a shoe upon the last, and means for actuating the wipers to close the same over the edge of the shoe sole, of members carried by the hold-down and adjustable toward and from the opposite edges of the shoe sole to limit the inward closing of the wipers.

36. In a lasting machine, the combination with lasting devices adapted to engage the toe portion of a shoe upon a last, of means for supporting the last with a shoe thereon in position for lasting comprising clamping members to engage the toe portion of the last and clamp the same between them, means for actuating said clamping members, a heel supporting member to engage the heel portion of the shoe upon the last and take the thrust of said devices and means for moving said heel member into engagement with the heel of the shoe in timed relation to the movement of the clamping members.

37. In a machine of the character described, the combination with lasting means and means for clamping the toe portion of a last to support the same with a shoe thereon in position for lasting, of a heel engaging member pivotally supported to swing into engagement with the heel of the last, and means operated in timed relation to the movement of the lasting means for automatically moving said member into engagement with the heel of the last.

38. In a machine of the character described, the combination with lasting devices and means for actuating the same, of a supporting member for holding a last in position for lasting a shoe thereon, and a heel engaging member pivoted to swing upon a transverse axis into engagement with the heel portion of a shoe on the last and to turn upon an upwardly extending axis to adjust itself to said heel portion and means automatically to move said member into engagment with the last.

39. In a machine of the character described, the combination with lasting devices and means for actuating the same, of a support for a last, a heel member adapted to be moved into engagement with the heel portion of a shoe upon the last, and means operated in timed relation to the movement of the lasting devices for locking the heel member in engagement with the shoe heel.

40. In a lasting machine, the combination with wipers adapted to engage the toe portion of a shoe upon a last, of means for supporting the last with a shoe thereon in position for lasting comprising members to engage the last from above and below its toe portion to clamp the same between them, a heel member to engage the end of the heel of said shoe upon a last, a bracket for carrying said heel member pivotally supported above the last and forwardly of the heel portion thereof to swing downwardly and rearwardly to bring the said heel member into engagement with the shoe, and means for holding said bracket in the position to which it is turned.

41. In a lasting machine, the combination with wipers adapted to engage the toe portion of a shoe upon a last, of means for supporting the last with a shoe thereon in position for lasting, a heel engaging member, a bracket for carrying said member, a supporting member to which the bracket is pivotally attached, an arm on the bracket, and a movable member forming a wedge between the supporting member and arm to swing the bracket upon its pivot and lock the same in the position to which it is swung.

42. In a lasting machine, the combination with lasting devices, and means for supporting a last with a shoe thereon in position for lasting, of a hold-down for holding the last upon its support, means for moving said support and hold-down relatively to clamp the last between them, a heel member adapted to be moved into engagement with the heel of the shoe on the last, and means operating in timed relation to the relative movement of said support and hold-down for moving said heel member into contact with the heel of the shoe.

43. In a machine of the character described, the combination with lasting devices and means for actuating the same, of movable means for supporting and holding a last with a shoe thereon in position for lasting, a heel engaging member carried by said last supporting and holding means and adapted to be adjusted into engagement with the heel portion of said last, means for moving said last supporting and holding means and said heel member carried thereby, and separate means for moving said heel member into contact with a shoe heel operating in timed relation to said means.

44. In a lasting machine, the combination with lasting devices and means for supporting a last with a shoe thereon in position for lasting, of a supporting member, a bracket pivotally attached to said member, a heel member carried by the bracket, an arm on the bracket extending adjacent to the supporting member, and a member movable along the supporting member between the same and said arm to form a wedge for turning the bracket and locking the same with the heel member in engagement with the heel of a shoe on the last.

45. In a lasting machine, the combination with lasting devices and means for actuating the same, and means for supporting a last with a shoe thereon in position for lasting, of a supporting member, a heel member pivotally attached to said supporting member to turn into engagement with the heel of the shoe upon said last and arranged to swing laterally of the last, an arm for turning the heel member on its pivot extending adjacent to the supporting member, a wedge member movable between said supporting member and said arm to turn the heel member and hold the same in the position to which it is turned, and means operating said wedge member in timed relation to the actuation of the lasting devices.

46. In a machine of the character described, the combination with lasting devices and means for actuating the same, of means for supporting a last with a shoe thereon in position for lasting comprising members to engage the toe portion of the last above and below the same and clamp the last between them, and a heel holding member pivoted to swing laterally of the last and automatically movable in the direction of the length of the last into engagement with the end of the heel of the last to take the thrust of the lasting devices.

47. In a machine of the character described the combination with wiper plates movably supported to close upon the end of a shoe, of an actuating member having a determinate closing movement, and separate yielding connections between said actuating member and each of said wiper plates.

48. In a machine of the character described the combination with wiper plates movably supported to close upon a toe of a shoe and freely adjustable laterally of the shoe around the toe thereof by the engagement of the shoe therewith, of an actuating member, members connecting said actuating member and said plates, each adjustable to increase or decrease the effective length of said connection and adjust each plate relatively to and independently of the other.

49. In a machine of the character described, the combination with wipers movably supported to close upon the end of a shoe, of means for actuating the wipers comprising an equalizing bar, connecting members pivotally attached at one end to the ends of said bar and adjustably connected near their opposite ends to the wipers, and an actuating member pivotally attached to said equalizing bar intermediate the ends of said bar.

50. In a machine of the character described the combination with wipers movably supported to close upon the end of a shoe, of means for actuating said wipers comprising an equalizing bar, connecting members pivotally attached at one end to the ends of the bar and having screw-threaded engagement with the wiper members and adapted to be turned to change their effective length and adjust the wiper members relatively, and an actuating member pivotally attached to the equalizing bar intermediate the ends of said bar.

51. In a machine of the character described the combination with wiper members movably supported to close upon the end of a shoe, of means for actuating the wiper members comprising an actuating member, and a member connecting each wiper member and said actuating member, each of said connecting members being yieldable in the direction of its length and longitudinally adjustable relative to said wiper member.

52. In a machine of the character described, the combination with wiper plates and movable supporting members for said plates adapted to be actuated to close the plates upon the end of a shoe, an actuating member, connecting members having pivotal connection with the actuating member and movable in the direction of their length relative to said actuating member, springs to resist such relative movement between the connecting members and the actuating member, and means for attaching each connecting member to a wiper carrying member.

53. In a machine of the character described, the combination with wiper members movably supported to close upon the end of a shoe, of an actuating member having a determinate movement, an equalizing bar, means connecting the ends of said equalizing bar and said wiper members comprising means for adjusting the said members relatively and independently, and operative connections between the actuating member and equalizer bar, said actuating member being adjustable to simultaneously adjust the wiper members.

54. In a machine of the character described, the combination with wiper members movably supported to close upon the end of a shoe, of an actuating member having a determinate movement, and means for transmitting motion from said member to each of said wiper members comprising an adjustable member and a yieldable member connecting said adjustable member and each wiper member.

55. In a machine of the character described, the combination with wiper plates adapted to turn about a common center, of a supporting head, independently movable carrier members for carrying the plates supported by said head and each formed with a slot curved concentrically with said center, means on the head engaging said slots to hold the carrier members in place, and means for actuating the carrier members.

56. In a machine of the character described, the combination with wiper plates adapted to embrace the end of a shoe, carrier members for said plates adapted to turn upon a common center, a supporting head for the carrier members, and means pivotally attached to the outer opposite sides of said carrier members for turning the same and actuating the plates.

57. In a machine of the character described, the combination with wiper plates adapted to embrace the end of a shoe, carrier members for said plates adapted to turn upon a common center, a supporting head having a slot to receive the carrier members and adapted to limit the turning of said members, and means for turning the carrier members in said slot pivotally attached to the carrier members at the outer sides thereof at each side of the head.

58. In a machine of the character described, the combination of a supporting head adapted to turn laterally upon a horizontal axis and to move longitudinally of said axis, wiper members carried by said head adapted to embrace the end of a shoe, means for actuating said wiper members having a jointed connection therewith, and means for moving the head in timed relation to the actuation of wiper members.

59. In a machine of the character described, the combination with wiper members movably supported to close upon the end of a shoe, of means for actuating said wiper members comprising an equalizing bar, eye members connected to the ends of said bar by an upwardly extending pivot, rods connected at one end to said wiper members and slidable within the eye members at their opposite ends, and springs to normally hold the rods against sliding through the eye members.

60. In a lasting machine, the combination with wiper plates, of carrier members for said plates adapted to turn to close the plates upon the end of a shoe, of means for turning the carrier members comprising an equalizing bar, a member having a determinate movement for actuating said bar, and a yielding connection between each end of said bar and said carrier members adapted to be turned to independently adjust the carrier members.

61. In a lasting machine the combination with wiper plates and carrier members for said plates adapted to turn to close the wipers upon the end of a shoe, of means for actuating the carrier members, comprising an equalizing bar, eye members on the ends of said bar, rods having sliding engagement with said eye members, eye members on the carrier members having screwthreaded engagement with said rods to permit the adjustment of the carrier members by the turning of said rods, and means for actuating the equalizing bar.

62. In a lasting machine the combination with wiper plates and carrier members for said plates adapted to turn and close the plates upon the end of a shoe, of means for actuating the carrier members comprising a member having a determinate movement, an equalizing bar actuated by said member, eye members on the ends of said bar, rods connected at their forward ends to the carrier members and having sliding engagement with the eye members at their rear ends, an adjustable abutment and a sliding abutment upon each rod, a heavy coiled spring sleeved upon each rod between the abutments, and a coiled spring of lesser strength sleeved upon each rod between the sliding abutment and the eye member.

63. In a machine of the character described, the combination with lasting devices, and means for supporting a last with a shoe thereon in position for lasting, of a sole engaging member, an operating member for raising and lowering said sole member, an actuating member having a determinate movement for actuating said operating member, said operating member comprising two pivotally connected parts, an adjustable stop member permitting a limited relative turning of one part of the said operating member upon the other part, and a spring to yieldingly resist the said relative turning of said parts.

64. In a machine of the character described, the combination with lasting devices and means for supporting a last with a shoe thereon in position for lasting, of a sole engaging member, an operating member for raising and lowering said sole member comprising two pivotally connected parts, an actuating member having a determinate movement for actuating said operating member, means for turning and adjustably holding one part of said operating member turned relative to the other part thereof arranged to permit a limited relative turning of said parts, and a spring to yieldingly resist the limited relative turning of said parts of said operating member.

65. In a machine of the character described, the combination with lasting devices and means for supporting a last with a shoe thereon in position for lasting, of a rocker pivotally supported intermediate its ends, a shoe engaging member connected to said rocker near one end and operated thereby, a tail piece pivotally attached to the other end of said rocker, a cam to engage the tail pieces and turn the rocker, means for yieldingly holding the tail piece from turning upon the rocker, and adjustable means for limiting the turning of the tail piece relative to the rocker.

66. In a machine of the character described, the combination with lasting devices and means for supporting a last with a shoe thereon in position for lasting, of a rocker pivotally supported intermediate its ends, a shoe engaging member carried upon one end of the rocker, a tail piece pivotally attached to the opposite end of said rocker, a cam to engage the tail piece and turn the rocker, a member adjustably attached to the rocker and forming a stop to limit the turning of the tail piece relative to the rocker in each direction, and a spring to yieldingly hold said tail piece from turning relative to the rocker.

67. In a machine of the character described, the combination with lasting devices and means for supporting a last with a shoe thereon in place for lasting, of a rocker pivotally supported intermediate its ends, a shoe engaging member carried upon one end of the rocker, a tail piece pivotally attached to the opposite end of said rocker, a cam to engage the tail piece and turn the rocker, a screwthreaded rod engaging a screwthreaded opening in the rocker and provided with stop shoulders at each side of the tail piece to limit the turning of the tail piece relative to the rocker, and a spring to yieldingly hold the tail piece from turning.

68. In a machine of the character described, the combination with lasting devices and means for supporting a last with a shoe thereon in position for lasting, of a bar pivoted to turn upon a transverse axis, a member adapted to engage a shoe sole upon the last at the end thereof, a lever pivotally attached to the forward end of the bar to turn upon a horizontal axis and forming a support for said member, adjustable means for limiting the turning of said lever upon said bar, and a spring to yieldingly hold the lever from turning.

69. In a lasting machine, the combination with lasting devices and means for supporting a last with a shoe thereon in position for lasting, of a rocker bar, a lever pivotally attached at one end to said bar to turn upon a horizontal axis and provided with an opening in its pivoted end, a post adjustably secured within said opening, a member on the lower end of the post to engage a shoe sole upon the last, means engaging the rear end of the lever to limit the turning thereof in one direction, and a spring to yieldingly hold the lever from turning in an opposite direction.

70. In a lasting machine the combination with lasting devices and means for supporting a last with a shoe thereon in position for lasting, of a rocker bar having a forked forward end, a lever pivotally supported within said forked end and provided with a screwthreaded opening, a post adjustable within said opening, a sleeve rotatable upon the post and externally screwthreaded to engage the screwthreaded opening in the lever, a member detachably secured to the lower end of the post for engaging a shoe sole upon the last, means attached to the bar and adjustably engaging the lever to limit its turning, and a spring to yieldingly hold the lever from turning.

71. In a machine of the character described, the combination of wipers adapted to close upon and embrace the end of a shoe upon a last, means for supporting the last, means for moving said wipers and last support relatively to cause the wipers to upwipe the shoe upper around and against the end of the last, means for actuating the wipers to close the same upon the end of the shoe and advance the edges of the wipers over the edge of a sole upon the last to form the shoe upper down thereon, said means for actuating the wipers being arranged to operate in timed relation to the means for moving the last support and wipers relatively, and means for automatically stopping the actuation of the wipers after the upwiping operation has been completed and after the advance of the wipers over the edge of the sole.

72. In a machine of the character described the combination of wipers for forming a shoe upper against the end of a last and over the edge of a sole on the last, a last support, means for actuating said support and wipers relatively to cause the wipers to upwipe the shoe upper around and against the end of the last, means for actuating the wipers to open and close the same and advance their edges over the edge of a sole upon the last, said means operating in times relation to the actuation of the means for moving said support and wipers relatively, and said latter means operating to relieve the pressure of the wipers upon the formed over edge of the shoe upper upon the sole to permit of drawing a wire between said wipers and edge at the end of the advancing movement of the wipers, and means operating in timed relation to the actuation of said wipers and the relative movement of said support and wipers to stop the wipers at the end of their advancing movement over the edge of the sole.

73. In a lasting machine, the combination with lasting devices and means for actuating the same, of means for holding a last with a shoe thereon in position for lasting comprising a sliding member, a guide for said member, means for moving said sliding member in timed relation to the actuation of the lasting devices, a shoe engaging member yieldingly supported by the sliding member, and means for adjusting the shoe member upon the sliding member.

74. In a lasting machine, the combination with lasting devices and means for actuating the same, of means for holding a last with a shoe thereon in position for lasting comprising a sliding member, a guide for said member, means for moving said sliding member in timed relation to the actuation of the lasting devices, a shoe engaging member carried by said sliding member, a spring for yieldingly holding the shoe member in position to engage the shoe, means for adjusting the shoe member, relative to the sliding member, and means for adjusting the tension of said spring independently of said shoe member adjustment.

75. In a lasting machine, the combination with lasting devices and means for actuating the same, of means for holding a last with a shoe thereon in position for lasting comprising a sliding member, a guide for said member, means for moving said sliding member in timed relation to the actuation of the lasting devices, a shoe engaging member, a member for carrying the shoe member mounted in bearings on the sliding member to move therein, a spring to yieldingly hold the carrying member against movement in its bearings, means for adjusting said carrying member on its bearings, and means for adjusting the tension of said spring independently of the adjustment of the carrying member.

76. In a lasting machine the combination with lasting devices and means for actuating the same, of means for holding a last with a shoe thereon in position for lasting comprising a sliding frame having bearings, a guiding member for said frame, means for moving the frame on its guiding member in timed relation to the movement of the lasting devices, a post slidable in the bearings on the frame, a shoe engaging member on said post, a spring sleeved on the post between said bearings, a collar on the post engaging one of the bearings and the end of the spring, and a sleeve on the post adjustable relatively to the bearing to adjust the tension of the spring.

77. In a machine of the character described, the combination of wiper plates having formed edges and adapted to be closed upon the end of a shoe upon a last, means for actuating said wipers, members for supporting a last with a shoe thereon in position for lasting adapted to clamp the toe portion of said last between them, means for actuating said members relatively in timed relation to the movement of the wipers to clamp the last, means for moving the wipers and last supporting members relatively in timed relation to the movement of the wipers to cause said wipers to upwipe the shoe upper upon the end of the last, a series of pincers having jaws to engage the shoe upper and supported independently of the wipers, means for simultaneously closing the pincer jaws in timed relation to the movement of the wipers, and means for bodily moving the pincers in timed relation to the movement of the jaw closing means and wipers to stretch the shoe upper.

78. In a machine of the character described, the combination of wiper plates having formed edges and adapted to be closed upon and embrace the end of a last, means for supporting a last with a shoe thereon in operative relation to said plates, means for operating said plates to close the same upon the end of the shoe with a pivotal movement, members for engaging an edge of that portion of the shoe upper adapted to be engaged by said plates at the end and sides adjacent the end of the last, and power means for operating said members in timed relation to the operation of the wiper plates to stretch the upper around and against the end portion of the last.

79. In an end lasting machine, the combination of wiper plates having formed edges and adapted to be closed upon and embrace the end of a last, means for supporting a last with a shoe thereon in operative relation to said plates, members for gripping the edge of that portion of the shoe upper adapted to be engaged by said plates, and power means for operating the plates and for moving said members and last support relatively in timed relation to stretch the upper prior to the operation of the plates and to hold said edge of the upper during said operation to put a strain on the upper while the plates are being closed.

80. In a machine of the character described, the combination of means for forming a shoe upper over the edge of a last, means for operating the forming means, pulling members to engage the edge of said upper, and means for imparting two movements to said members to stretch the upper up around the last and to spread said edge.

81. In a machine of the character described having, in combination, members for gripping the edge of a shoe upper movable relatively and angularly with relation to each other and also transversely of the shoe, and means whereby said movements may be effected.

82. In a machine of the character described, the combination of members for gripping the edge of a shoe upper projecting above the sole at opposite sides of and closely adjacent to one end of its last constructed and arranged to be moved diagonally outward from the opposite sides of the last to spread and stretch the upper, and power operated means for moving said members in said directions to stretch and spread the upper.

83. In a machine of the character described, the combination of means for supporting a last with a shoe upper thereon in position for lasting, and members for gripping the edge of a shoe upper projecting above the sole at opposite sides of and closely adjacent to one end of the last, with power-operated means automatically operative to move said gripping members diagonally outwardly and forwardly from the opposite sides of the last to spread and stretch the upper.

84. In a machine of the character described, the combination of means for supporting a last with a shoe upper thereon in position for lasting, members for gripping the edge of the upper projecting above the insole on the last at opposite sides of and closely adjacent to one end of the last, power means for operating said members to grip the said edge of the shoe upper and for subsequently moving said members laterally outward from the opposite sides of the last in planes substantially parallel to the plane of the bottom of the last and in directions diagonally outwardly and forwardly toward the end of the last to stretch and spread the upper.

85. In a machine of the character described, the combination of means for supporting a last with a shoe upper thereon in position for lasting, members for gripping the edge of a shoe upper projecting above the sole at opposite sides of and closely adjacent to one end of its last, and power means for relatively moving said last support and gripping members to updraw and stretch the upper around the last at said end, and for subsequently moving said gripping members diagonally outward from the opposite sides of the last to stretch and spread the upper.

86. In a machine of the character described, the combination of means for supporting a last with a shoe upper thereon in position for lasting, members for gripping the edge of the upper projecting above the insole on the last at opposite sides of and closely adjacent to the toe end of the last, and power operated means for operating said members to grip the edge of the upper and for subsequently moving said members laterally outward from the opposite sides of the last at an oblique angle to the longitudinal median line of the forepart of the last to stretch and spread the upper transversely of the last.

87. In a machine of the character described, the combination of members for gripping the edge of a shoe upper projecting above the sole at opposite sides of and closely adjacent to the toe end of its last, power means for operating said members to grip the edge of the upper and for subsequently moving said members laterally outward from opposite sides of the last in diagonally forward directions to tension and stretch the upper transversely of the last and wiping means for thereafter forcing the tensioned upper over the bottom of the last and over the edge of the insole into lasted position.

88. In a machine of the character described, the combination of means for supporting a last with a shoe upper thereon in position for lasting, members for gripping with yielding tension the edge of the upper projecting above the insole on the last at opposite sides of the last at one end, power means for operating said members to grip the edge of the upper and for subsequently moving said gripping members laterally outward from the opposite sides of the last in diagonally forward directions to tension and stretch the upper, and wipers constructed to conform substantially to the curved end of the last, with means to cause said wipers to advance inwardly over the bottom of the last and insole to mold the outwardly tensioned upper to the side and over the bottom of the last and edge of the insole.

89. In a machine of the character described, the combination of members for gripping the edge of the shoe upper projecting above the sole with yielding tension at opposite sides of the toe end of its last, power means for operating said members to grip the edge of the upper and for subsequently moving said members laterally outward in directions diagonally forward from the opposite sides of the toe end of the last to tension and spread the upper transversely of the last, formed toe wipers movable to embrace and close over the toe end of the last and means for causing said wipers to advance over the edge of the insole to mold the upper to the toe end of the last while said upper is under tension and to wipe it down over the edge of the insole into lasted position.

90. In a machine of the character described, the combination of means to support a last with a shoe upper thereon in lasting position, members for gripping with yielding tension the edge of the shoe upper above the insole on the last at opposite sides of and adjacent to one end of the last, mechanism for operating said members to grip the edge of the upper and for subsequently moving said gripping members laterally outwardly in directions diagonally forward toward said end of the last to tension and spread the upper outward at said end of the last and for determinately maintaining said grippers in such tensioning position, and end wiping means operative in timed relation to engage the upper below the plane of the last bottom while under such tension and to force the upper against the last and over the edge of the last bottom and partially to pull the upper from said yieldingly tensioned gripping members in response to the tension on the inwardly wiped upper.

91. In a machine of the character described, the combination of means to support a last with a shoe upper thereon in position for lasting, members for gripping with yielding tension the edge of the upper above the insole on the last and opposite sides of and adjacent to one end of the last, means to operate said members to grip the edge of the upper, means subsequently operative to effect relative movement of the last and gripping members to updraw the gripped end of the last and to move the gripping members laterally outward from the opposite sides of the last in directions diagonally forward toward said end of the last to tension the upper and determinately to maintain the grippers so moved, wiper mechanism operative in timed relation to embrace said end of the shoe below the last bottom to force the upper against the last and to wipe it over the edge of the bottom of the last while under such tension and partially to pull the upper from said yieldingly tensioned gripping members in response to the tension on the inwardly wiped upper, said wiper mechanism being operative to continue the closing movement of the wipers over the bottom of the last and edge of the insole, and means operative coincidently to move said gripping members inwardly toward the sides of the last and to release the gripped upper.

92. In a machine of the character described having, in combination, a last support, formed wipers for embracing the end of a last, means for moving the support and wipers relatively to cause the wipers to engage and upwipe the upper around and against the curved end surface of a last and form the same over the edge of the sole portion of the last, and means for controlling the operation of said means to cause a repetition of the upwiping movement of the wipers in forming the wipers against said curved end surface.

93. In a machine of the character described having, in combination, a last support, power operated means for wiping an upper up over the side of a last and over the sole portion thereof, and means for stopping the operation of said power means and for effecting a reversal of the relative positions of operating parts and repetition of a portion of the wiping operation.

94. In a machine of the character described having, in combination, a last support, wiper plates having formed edges to embrace the end of a shoe upon the last, means for operating the wiper plates, means for moving the last support and wiper plates relatively to cause said wiper plates to upwipe the upper around and against the end of the last, and means controlling the last named means to cause a reversal of the relative positions of operating parts and a repetition of the operation of upwiping the upper against said end surface.

95. In a machine of the class described, the combination of wiper plates adapted to embrace the end of a shoe upper on its last, means for supporting a last with its shoe upper in position for lasting, means normally tending bodily to move the wiper plates toward said end of the last and yieldingly against the extreme end of the shoe upper, and mechanism operative to control bodily movement of the wiper plates and arranged to permit determinate bodily movement of said wiper plates toward the end of the shoe under the action of said means and determinately to effect bodily movement of the wiper plates away from said end of the last against the action of said means.

96. In a machine of the class described, the combination of wiper plates adapted to embrace the end of a shoe upper on its last, means for supporting a last with its shoe upper in position for lasting, means normally tending bodily to move the wiper plates toward said end of the last and yieldingly against the extreme end of the shoe upper, and mechanism operative to control bodily movement of the wiper plates and including a cam operatively connected with the wiper plates and arranged to permit determinate bodily movement of said wiper plates toward the end of the shoe under the action of said means and determinately to effect bodily movement of the wiper plates away from said end of the last against the action of said means.

97. In a machine of the class described, the combination of pivoted wiper plates adapted to be swung to embrace the end of a shoe upper on its last, means for supporting a last with its shoe upper in position for lasting, means normally tending bodily to move the wiper plates toward said end of the last and yieldingly to hold said plates against the extreme end of the shoe upper, mechanism operative to control said bodily movement of the wiper plates and arranged to permit determinate bodily movement of said wiper plates toward the end of the shoe under the action of said means and determinately to effect bodily movement of the wiper plates away from said end of the last and shoe against the action of said means and means operable independently of said controlling mechanism to swing the wiper plates toward and from each other in timed relation to said bodily movement of said plates toward and from the end of the shoe.

98. In a machine of the class described, the combination of upper engaging means mounted for closing movement to embrace one end of a last and shoe upper, and supported against downward movement perpendicularly to the plane of the last bottom, means to support a last and shoe with the insole on the last normally above the line of contact of said end embracing means, said supporting means being mounted for movement substantially perpendicular to the plane of the last bottom, mechanism to close said end embracing means against the side of the shoe upper and in timed relation to depress the last support with the last and shoe upper to cause said embracing means to upwipe the upper over the side of the last.

99. In a machine of the class described, the combination of wiper plates mounted for closing movement to embrace one end of a last and shoe upper and supported against downward movement perpendicularly to the plane of the last bottom, means to support a last and shoe with the insole normally above the plane of said wiper plates, said supporting means being mounted for movement substantially perpendicular to the plane of the last bottom, mechanism to close said wiper plates against the side of the shoe upper at said end of the last and, in timed relation, to depress the last support with the last and shoe upper and to cause the wiper plates to engage and upwipe the upper over the side of the last and over the edge of the last bottom and insole.

100. In a machine of the class described, the combination of wiper plates mounted for closing movement to embrace one end of a last and shoe upper and supported against downward movement perpendicularly to the plane of the last bottom, means to support a last and shoe with the insole normally above the plane of the said wiper plates, said supporting means being mounted for movement substantially perpendicular to the plane of the last bottom, mechanism to close said wiper plates against the side of the shoe upper at said end of the last and, in timed relation, to depress the last support with the last and shoe upper and to cause the wiper plates to engage and upwipe the upper over the side of the last and over the edge of the last bottom and insole, and subsequently operative to retract the wiper plates, elevate the last support and repeat said operation.

101. In a machine of the class described, the combination of upper engaging means mounted for closing movement to embrace one end of a last and shoe upper, and supported against downward movement perpendicularly to the plane of the last bottom, and arranged to yield bodily lengthwise of the last and away from said end of the last, means to support a last and shoe with the insole on the last normally above the line of contact of said end embracing means, said supporting means being mounted for movement substantially perpendicular to the plane of the last bottom, mechanism to close said end embracing means against the side of the shoe upper and in timed relation to depress the last support with the last and shoe upper to cause said embracing means to upwipe the upper over the side of the last.

102. In a machine of the character described, the combination of means to support a last with a shoe upper thereon in position for lasting, gripping means for engaging the upstanding edge of the shoe upper at opposite sides of its last, mechanism operative to move said gripping means in directions transversely of the last automatically to position them to engage the upstanding edge of an upper at said opposite sides of its last and mechanism operative to cause said means to grip said edge and subsequently operative to move the gripping means laterally outward to stretch the shoe upper.

103. In a machine of the character described, the combination of means to support a last with a shoe upper thereon in position for lasting, grippers for engaging the upstanding edge of a shoe upper closely adjacent to and at opposite sides of one end of its last mounted for movement transversely of the last toward and from said opposite sides of the last, mechanism operative to move said grippers toward the last automatically and determinately to position them to engage said opposite upstanding edges and to actuate said grippers to grip said edges, and means operable to move said grippers laterally away from the opposite sides of said last to stretch the shoe upper.

104. In a machine of the character described, the combination of means to support a last with a shoe upper thereon in position for lasting, grippers for engaging the upstanding edge of a shoe upper closely adjacent to and at opposite sides of one end of its last and mounted for movement laterally toward and from said opposite sides, mechanism operative to move said grippers toward the last and automatically and determinately to position them to engage said opposite upstanding edges and to actuate them to grip said edges, means operative subsequently and in timed relation to move said grippers laterally outward from the opposite sides of the last to stretch the shoe upper, and wiper mechanism operative in timed relation to wipe the stretched upper over the edge of the insole on the last at said end of the shoe.

105. A machine for working the toe portion of an upper into lasted position, having, in combination, grippers arranged to engage the edge of the upper at opposite sides of and closely adjacent to the toe end of the last, and actuating mechanism arranged to move the grippers and last relatively and in a direction substantially perpendicularly to the last bottom to updraw the upper about the last and arranged to move the grippers laterally outwardly in a diagonally forward direction to outdraw and stretch the upper.

106. A machine for working the toe portion of an upper into lasted position having, in combination, grippers arranged to engage the edge of the upper above the bottom of the last at opposite sides of and closely adjacent to the toe end of the last, and actuating mechanism operative to effect relative movement of the grippers and last substantially perpendicularly to the last bottom to cause the grippers to updraw the upper about the last and to effect movement of the grippers laterally outward from the opposite sides of the toe in diagonally forward directions and in planes substantially parallel to the plane of the bottom of the last.

107. A machine for working the toe portion of an upper into lasted position having, in combination, means to support a last with a shoe upper thereon in position for lasting, grippers arranged to engage the edge of the upper on a supported last above the bottom at opposite sides of and closely adjacent to the toe end of the last, mechanism operative to close the grippers and to effect relative movement of the last and grippers substantially perpendicularly to the plane of the last bottom to cause the grippers to updraw the upper, wipers constructed and arranged to embrace the toe below the bottom of the last and to wipe the upper over the insole, mechanism for operating said wipers, and means to move said grippers laterally outward from the opposite sides of the toe to stretch the upper and to maintain it so stretched under tension while the wipers close against and mold the upper to the toe of the last and until they advance on to the edge of the last bottom.

108. A machine for working the toe portion of an upper into lasted position having, in combination, means to support a last with a shoe upper thereon in position for lasting, grippers arranged to engage the edge of the upper above the bottom of the supported last at opposite sides of and closely adjacent to the toe end of the last, and power operated mechanism organized automatically to effect relative movement of the grippers and shoe last to updraw the upper about the toe end of the last and to outdraw the upper transversely of the last in diverging directions inclining forwardly.

109. A machine for working the toe portion of an upper into lasted position having, in combination, means to support a last with a shoe upper thereon in position for lasting, grippers arranged to engage the edge of the upper above the bottom of the supported last at opposite sides of and closely adjacent to the toe end of the last, wipers constructed and arranged to embrace the toe below the bottom of the last and to wipe the upper over the insole, and organized mechanism operative automatically and in timed relation to close the grippers, to effect relative movement of the last and grippers to cause the grippers to updraw the upper about the toe of the last and to outdraw the upper laterally of the last to stretch and tension the upper, to operate said wipers to close against and mold the upper to the toe of the last and over the last bottom and insole, to maintain the grippers in position laterally to stretch and tension the upper while the wipers are molding the upper and until they reach the edge of the last bottom, and to relieve the laterally outward tension on the upper and to release the upper as the wipers advance over the bottom of the last and insole to lay the edge of the upper in lasted position.

110. A machine for working the toe portion of an upper into lasted position having, in combination, means to support a last with a shoe upper thereon in position for lasting, toe embracing wipers, grippers arranged to engage the edge of the upper above the bottom of the supported last at opposite sides of and closely adjacent to the toe end of the last, means for depressing the last support to cause the grippers to updraw the upper about the toe of the last, means to operate the grippers to outdraw the upper obliquely forward from the sides of the last toe and to hold it tensioned for the closing movement of the wipers, and means for closing the wipers against the toe of the last and for advancing the wipers over the bottom of the last and edge of the insole, said gripper operating means being constructed and arranged to permit the grippers to move inwardly as the wipers are advanced over the bottom of the last and insole.

111. A machine for working the toe portion of an upper into lasted position, having in combination, means to support a last with a shoe upper thereon in position for lasting, toe embracing wipers, grippers arranged to engage the edge of the upper above the bottom of the supported last at opposite sides of and closely adjacent to the toe end of the last, means for operating the last supporting means to force the last away from the grippers to cause the grippers to updraw the upper about the toe of the last and to position the last so that the wipers may be advanced over the bottom of the last in a plane between the last bottom and the grippers, means to effect relative movement of the last and grippers to outdraw the upper obliquely forward from the sides of the last toe to spread and tension the toe end of the upper transversely of the last, and means relatively to move the wipers and last to effect the wiping of the upper over the bottom of the toe end of the last.

112. A machine for working the toe portion of an upper into lasted position, having, in combination, means to support a last with a shoe upper thereon in position for lasting, toe embracing wipers, grippers arranged to engage, with yielding tension, the edge of the upper above the last bottom and insole at opposite sides of and closely adjacent to the toe end of the last, power operated mechanism arranged automatically to move the last supporting means and last to cause the grippers to updraw the upper about the toe of the last with a slipping tensioned grip and to position the last bottom sufficiently far below the grippers to allow the wipers to be advanced over the bottom of the last and beneath the grippers, and means operative in timed relation to said movement of the last for moving the wipers and the last relatively to effect the wiping of the upper over the bottom face of the toe of the last.

113. A machine for working the toe portion of an upper into lasted position having, in combination, means to support a last with an upper thereon in position for lasting, grippers arranged to engage the edge of the upper above the bottom of the last at opposite sides of and closely adjacent to the toe end of the last, toe embracing wipers positioned in a plane below the normal plane of the last bottom, mechanism automatically operable in timed relation to depress the last relatively to the grippers and wipers in a direction substantially perpendicularly to the last bottom substantially to aline the last bottom with said wipers and to cause the grippers to updraw the upper over the toe of the last, and including means coincidently operable to move the grippers laterally outward from the toe in obliquely forward directions and to advance the wipers over the bottom of the last when the last bottom reaches substantially alined position.

114. A machine for working the end portion of a shoe upper into lasted position, having, in combination, means to support a last with a shoe upper thereon in position for lasting, end embracing wipers, grippers arranged to engage the edge of the upper above the bottom of the last at opposite sides of and closely adjacent to one end of the last, mechanism operable to move the grippers laterally outward from the opposite sides of the last to tension the upper transversely of the last, other mechanism operable in timed relation to cause the wipers to embrace the outwardly tensioned upper and to wipe it over the bottom of the last, said first named mechanism being operable to move the grippers inwardly toward the sides of the last in timed relation to the wipers as they are advanced over the last bottom so as to maintain outward tension on the upper until the wipers have advanced inwardly beyond the edge of the last bottom.

115. A machine for working the toe portion of a shoe upper into lasted position having, in combination, means to support a last with a shoe upper thereon in position for lasting, toe embracing wipers, grippers arranged to engage the edges of the upper above the bottom of the last at opposite sides of and closely adjacent to the toe end of the last, mechanism operable to cause the grippers to updraw the upper about the toe of the last and to outdraw and tension the upper transversely of the toe end of the last, other mechanism operable in timed relation to cause the wipers to embrace the outwardly tensioned upper and to wipe it over on to the bottom of the toe end of the last, said first named mechanism being operable to move the grippers inwardly toward the sides of the last in timed relation to the movement of the wipers as they are advanced over the last bottom so as to maintain outward tension on the upper until the wipers have advanced inwardly over and beyond the edge of the last bottom.

116. In a lasting machine, the combination of wiper plates having formed edges, means for holding a last with a shoe in place thereon for lasting, means for moving the wiper plates and holding means relatively to cause the plates to engage and wipe the shoe upper up around the toe of a last, pincers for engaging the edge of a shoe upper, and means for actuating said pincers outwardly from the edge of the last in timed relation to the movement of the wipers.

117. In a lasting machine, the combination of wiper plates having formed edges, means for holding a last with a shoe in place thereon for lasting, means for moving the wiper plates and holding means relatively to cause the plates to engage and wipe the shoe upper up around the toe of a last, pincers for engaging the edge of a shoe upper at opposite sides of the toe and means for moving said pincers outwardly in divergent directions from the median line of the toe of the last to stretch the shoe upper.

118. In a lasting machine, the combination of toe embracing wipers, means for actuating said wipers, a series of pincers to engage the upstanding edge of the toe of the upper upon a last, and means actuated in timed relation to the actuation of the wipers for automatically closing said pincers upon said edge of the shoe upper and causing them to spread the upper outwardly over the wipers while the wipers are closing.

119. In a lasting machine, the combination of toe embracing wipers, means for actuating said wipers, pincers to engage the edge of a shoe upper about the toe of a last, and means operating in timed relation to the action of the wipers for moving the pincers bodily to stretch the upper and then hold it outspread over the wipers while the wipers close.

120. In a machine of the character described, the combination of wiper plates having formed edges, means for moving said wiper plates forwardly and closing the same upon the end of a boot or shoe upon a last, means for supporting a last with a shoe thereon in place for lasting, means for moving said support and plates relatively to wipe the shoe upper up around the end of the last and over the bottom of the last, pincers for engaging the upstanding edge of the shoe upper, means for automatically closing the pincers upon said edge prior to the upwiping movement of the wipers and means for moving the pincers to spread the upper over the wipers and hold it for the overwiping movement of the wipers.

121. In a machine of the character described, the combination of wipers having a continuous forming edge to engage a shoe upper and form the same over the margin of a last, members to grip the upper near its edge, means for operating the wipers, and means for moving said gripping members transversely of the vertical plane of said edge of the wipers from within the vertical plane of said edge of the wipers to a point outside thereof in timed relation to the closing movement of the wipers to prepare the upper for the forming action of the wipers.

122. In a lasting machine, the combination of wipers movably supported to close upon the end of a shoe upon a last, means for supporting the last with the shoe thereon, means for moving the supporting means and wipers relatively to bring said wipers into wiping contact with the shoe, means for actuating the wipers to close the same upon the end of the shoe, means for gripping the shoe upper near its edge to pull the upper, and means for actuating the gripping means in timed relation to the relative movement of the wipers and last supporting means to stretch the upper in a direction to hold it outdrawn over the wipers during the closing movement of the wipers.

123. In a lasting machine, the combination of wipers movably supported to close upon the end of a shoe upon a last, means for supporting the last with the shoe thereon, means for moving the supporting means and wipers relatively to wipe the upper into contact with the last, means for actuating the wipers to close the same upon the end of the shoe and form the upper over the edge of and down upon a sole upon the last, grippers operated in timed relation to the wiper movement for holding the edge of the upper outdrawn across the edge of the wipers during the closing movement of the wipers to cause the upper to be stretched by said closing of the wipers.

124. In a lasting machine, the combination of wiper plates supported to move toward and from each other to embrace the end of a shoe upon a last, means for movably supporting the last, grippers to engage the edge of the shoe upper, means for actuating the wiper plates to close the same over the end of the shoe, and means for moving said supporting means relatively to said grippers and in timed relation to the opening and closing movements of the wipers to stretch the upper while being held by said grippers and for moving the grippers to outdraw the upper during the closing of the wipers.

125. In a lasting machine, the combination with suitable operating mechanism, of means for forming a shoe upper around and against the end of a last, and pulling members located at opposite sides of the center of the end portion of the last and movable laterally outward from the last to spread and stretch the upper over the forming means in timed relation with the operation of the forming means.

126. In a lasting machine, the combination of automatically actuated means for forming a shoe upper against a last, a member to grip the edge of the shoe upper, and means for moving said member outwardly from the last in timed relation to the actuation of the forming means to spread the upper during the forming operation.

127. In a machine for lasting the toes of welt shoes, the combination of wiper plates adapted to embrace the end of a last and wipe a shoe upper thereon against and around the end thereof, means for actuating the wiper plates to project the same over the edge of a ribbed insole upon a last, and means located over the shoe bottom and adjustable to the width of the insole between the ribs of the insole providing rigid abutment means for preventing the projection of said wiper plates over the shoe beyond the limit of movement required for lasting the upper against the rib of the insole.

128. In a machine of the character described, the combination of wiper plates having formed edges to engage the end of a boot or shoe upper upon a last, means for actuating said plates, means for supporting the last in position for lasting, a pivoted support for the wipers adapted to turn about an axis extending longitudinally of the last substantially in the median line thereof to permit the wipers to tilt laterally of the last, and means for yieldingly holding the support against turning.

129. In a lasting machine, the combination of wipers, means for actuating said wipers, a series of pincers to engage the upstanding edge of a shoe upper upon the last, means for closing said pincers upon said edge and means for actuating the pincers to draw the upper outwardly and for actuating the wipers in timed relation therewith to wipe the upper inwardly.

130. In a toe lasting machine, the combination of wipers adapted to embrace the toe end of a shoe, means for operating said wipers, pincers located at each side of the toe end of the shoe to engage the edge of the shoe upper, means for yieldingly holding the pincers moved bodily toward the sides of the shoe end, and means operating in timed relation to the wiper operating means for moving the pincers outwardly away from the sides of the shoe end against the action of said yielding means.

131. In an end lasting machine, the combination of wiper plates adapted to embrace an end of a shoe upon a last, means for supporting the last with a shoe thereon in place for lasting, and power operating means for the wipers permitting a yielding bodily movement of said wiper plates longitudinally of the last and relatively to said supporting means to provide a yielding contact between the end of the shoe and the plates around the end of the shoe.

132. In an end lasting machine, the combination with wiper plates having formed edges to embrace an end of a shoe upon a last, and wiper carriers upon which the plates have a self adapting movement to conform to the shape of the shoe end embraced by them, of means for adjusting one wiper carrier relatively to the other and maintaining said adjustment.

133. In an end lasting machine, the combination with wiper plates arranged to embrace and close over upon an end of a shoe and having a self adapting movement to conform to the shape of the shoe end embraced by them and means for actuating said wiper plates, of means for adjusting each plate toward or form the other independently of the movement imparted thereto by said actuating means.

134. In a machine of the class described, the combination with wiper plates adapted to turn about a common center, of means independently to close said plates, a supporting head, and connections between the plates and the head permitting independent conformation of said plates to the contour of the end of the last during closing movement of the plates, said connections including guiding means curved concentrically with said common center of the wiper plates.

135. In a machine of the character described, the combination with lasting means, of means for supporting a last in position for lasting, including a jack post, a fixed guide, a member slidable in said guide for carrying said post, a lever, a link connecting one end of the lever and said member, and power operated mechanism for actuating said lever to move said member in said guide in a direction to move the last supporting means into coöperative relation to said lasting means.

136. In a machine of the character described, the combination with means for supporting a last, lasting means reciprocable longitudinally of the last for engaging an upper thereon and forming the same against the last, power actuated means for moving said lasting means and reciprocating the same, an abutment member supported independently of the last supporting means and independently of said means for actuating the lasting means and power operated means for moving said abutment member into engagemenet with the end of the last to take the end thrust of the lasting means.

137. In a machine of the character described, the combination with means for forming a shoe upper to the end of a last and means for actuating said forming means, of a movable support for said end of the last, means for holding the last upon said support, and an adjustable abutment member for the other end of the last movable toward and from said support lengthwise of the last and arranged to swing about an axis substantially perpendicular to the plane of the last bottom with power-operated means to move said member into engagement with the end of the last.

138. In a machine of the character described, the combination with means for forming a shoe upper against the end of a last and means for actuating said forming means, of a movable jack to engage the end portion of a last and support the same, a presser member for clamping the last upon said jack, a rigid abutment member mounted for swinging movement about an axis substantially perpendicular to the plane of the last bottom and for movement lengthwise of the last into engagement with the other end of the last, and means for automatically locking said abutment member in position to engage said other end of the last prior to the operation of said forming means to prevent lengthwise displacement of the last by the thrust of said forming means.

139. In a machine of the character described, in combination, means for forming a shoe upper to the end of a last, and mechanism for actuating said forming means to upwipe the upper materials about the end of the last and to wipe them down over the edge of the sole on the last including power-operated means for causing said forming means to repeat the upwiping of the materials about the end of the last.

140. In a machine of the character described, in combination, means for forming a shoe upper to the end of the last, and power operated mechanism for actuating said forming means to upwipe the upper materials about the end of the last and to wipe them in over the edge of the sole on the last including means automatically to repeat the upwiping operation and to wipe the upper materials in over the edge of the sole.

141. In a power toe lasting machine, shoe supporting means, toe embracing wipers and operating mechanism organized automatically to bring the machine to rest for inspection of the work at the end of the lasting operation of the wipers combined with means for causing the operating mechanism to make the wipers repeat their lasting operation without releasing the shoe.

142. In a power toe lasting machine, shoe holding means and a pair of toe embracing wipers relatively movable to cause said wipers both to upwipe and to overwipe an upper and power operated mechanism for the shoe holding means and the wipers organized to make said wipers repeat an upwiping operation without releasing the shoe.

143. In a power toe lasting machine, shoe supporting means, reciprocable toe embracing wipers, pincers, and means to hold the pincers closed and yieldingly pulling while the wipers are reciprocated inwardly and outwardly from the edge of the toe.

144. In a power toe lasting machine, last and shoe supporting means, toe embracing wipers, pincers, and power operated mechanism by which to effect gripping, pulling and upwiping of the upper about the toe of the last, to repeat the last named operation and subsequently to effect overwiping of the upper.

145. In a toe lasting machine, the combination with shoe supporting means, of toe embracing wipers, and power operated mechanism for effecting a limited, adjustable, yielding, forward movement of the wipers to provide for variation in the thickness of the shoe stock or the size or shape of the toes of lasts.

146. In a toe lasting machine, the combination with shoe supporting means, of toe embracing wipers, power operated mechanism including means to bring the wipers in upwiping contact with the toe of the shoe, and mountings for the wipers arranged to permit the slanting form of the toe end of the last automatically to produce a slight rearward bodily yielding movement of the wipers as they upwipe.

147. In a toe lasting machine, the combination with means for supporting a last in position for lasting with a shoe upper thereon and toe embracing wipers organized to cause the wipers to engage the upper below the shoe bottom and wipe upwardly and then inwardly over the shoe bottom, of operating mechanism for advancing and closing the wipers including yielding elements in the advancing means and in the closing means enabling the wipers to adapt themselves to the position and shape of the shoe toe embraced by them.

148. In a toe lasting machine, the combination with means for supporting a last in position for lasting with a shoe upper thereon and toe embracing wipers organized to cause the wipers to engage the upper below the shoe bottom and wipe upwardly and then inwardly over the shoe bottom, of mechanism for advancing and closing the wipers including an operating member and a yielding element in the advancing means enabling the wipers to adapt themselves to the position of the toe end of the shoe during the upwiping movement, said yielding element impelling the wipers over the toe end of the shoe instantaneously independently of the operating member when the plane is reached in which the wipers can advance.

149. In a toe lasting machine, the combination with means for supporting a last in position for lasting with a shoe upper thereon and toe embracing wipers organized to cause the wipers to engage the upper below the shoe bottom and wipe upwardly and then inwardly over the shoe bottom, of operating mechanism for advancing and closing the wipers including yielding elements and a non-yielding actuator in the closing means enabling the wipers to adapt themselves to the width of the toe end of the shoe during the upwiping movement, said yielding elements impelling the wipers over the sides of the toe of the shoe instantaneously without waiting for the non-yielding actuator when the plane is reached in which the wipers can close.

150. In a toe lasting machine, the combination with means for supporting a last in position for lasting with a shoe upper thereon and toe embracing wipers organized to cause the wipers to engage the upper below the shoe bottom and wipe upwardly and then inwardly over the shoe bottom, of operating mechanism for advancing and closing the wipers including yielding elements in the advancing means and in the closing means enabling the wipers to adapt themselves to the position and shape of the shoe toe embraced by them, and means to limit the inward movement of the yieldingly operated wipers to prevent excessive overwiping.

151. In a toe lasting machine, the combination with means for supporting a last in position for lasting with a shoe upper thereon and toe embracing wipers organized to cause the wipers to engage the upper below the shoe bottom and wipe upwardly and then inwardly over the shoe bottom, of operating mechanism for advancing and closing the wipers including an operating member and a yielding element in the advancing means enabling the wipers to adapt themselves to the position of the toe end of the shoe during the upwiping movement, said yielding element impelling the wipers over the toe end of the shoe instantaneously independently of the operating member when the plane is reached in which the wipers can advance, and means arranged to back up the sewing rib of a welt insole at the toe end of the insole to prevent said yieldingly operated wipers from overriding the rib.

152. In a lasting machine, the combination with means for supporting a shoe, of end embracing wipers and operating mechanism including means for relatively moving the shoe and the wipers to effect upwiping and automatic means adapted to operate instantaneously for impelling the wipers inwardly over the shoe edge as soon as the plane is reached in which the wipers can close.

153. In a lasting machine, the combination with means for supporting a shoe, of toe embracing wipers and operating mechanism including means for relatively moving the shoe and the wipers to effect upwiping and wiper closing means including yielding elements operating to permit the wipers to adapt themselves to the shape of the toe during the upwiping movement and instantaneously to impel the wipers over the shoe edge as soon as the plane is reached in which the wipers can close.

154. In a lasting machine, the combination with means for supporting a shoe, of toe embracing wipers and operating mechanism including means for relatively moving the shoe and the wipers to effect upwiping and wiper closing means including a cam and yielding connections acting to impel the wipers over the shoe edge without waiting for the cam to act.

155. In a lasting machine, the combination with means for supporting a shoe, of toe embracing wipers, means including yielding elements for closing the wipers over the shoe bottom, and means constructed and arranged to engage the insole at the inner side of the sewing rib to back up the rib and prevent the yieldingly operated wipers from overwiping.

156. In a lasting machine, the combination with means for supporting a shoe, of toe embracing wipers, means for yieldingly closing the wipers over the edge of the insole, and means for positively arresting the movement of the yieldingly closed wipers when they have pressed the upper against the sewing rib of the insole.

157. In a power operated lasting machine, the combination with means for supporting a shoe, of toe embracing wipers and operating mechanism including means for relatively moving the shoe and the wipers to effect upwiping and means adapted to operate automatically and instantaneously to impel the wipers inwardly over the shoe edge as soon as the plane is reached in which the wipers can close over said edge, and a presser finger constructed and arranged to be positioned to engage the sole of a welt shoe at the inner side of the sewing rib, said presser foot being formed to substantially the contour of the sewing rib around the end of the toe and serving to arrest the closing movement of the wipers when they have formed the upper against the outer side of the sewing rib.

158. In a toe lasting machine, the combination, with means for working an upper over the toe of a shoe, of an insole controller comprising a stem, a foot member thereon adapted to engage the insole adjacent to the sewing rib thereof, and means for adjusting the foot member forwardly and backwardly to permit it to engage the insole alternatively inside or outside of the sewing rib.

159. In a machine of the class described, the combination with grippers arranged to seize and hold the upper at the corners of the toe, and shoe handling means operating to depress the last to effect pulling of the upper, of means for swinging the grippers in a plane substantially parallel with the shoe bottom in directions oblique to the median line of the shoe.

160. In a machine of the class described, the combination with grippers arranged to seize and hold the upper at the corners of the toe, and shoe handling means operating to depress the last to effect pulling of the upper, of toe embracing wipers, means to operate the wipers and the shoe handling means relatively to effect wiping of the upper over the toe of the last, and means for swinging the upper holding grippers in time relation with the overwiping movement.

161. In a toe lasting machine, the combination with toe embracing wipers, of upper holding grippers located over the wipers in position to tension the upper longitudinally, and means for operating the wipers and the grippers in time relation to tension the upper longitudinally while the wipers gather the upper over the toe of the last.

162. In a machine of the class described, the combination with toe embracing wipers and grippers which are separate from the wipers and are arranged over the wipers to engage the upper at the corners of the toe of the last, of means for moving the grippers in a plane substantially parallel with the plane of the wipers to put the upper at the corners of the toe under longitudinal tension while the wipers gather it in to lasted position over the edge of the last bottom.

163. In a toe lasting machine, the combination with toe embracing wipers movable to close over the bottom of a shoe, of grippers arranged to hold the edge of the upper at the corners of the toe, and means for swinging the toe embracing wipers to close over the bottom of the shoe and for bodily swinging the corner grippers in time relation with the swinging of the toe embracing wipers.

164. In a machine of the class described, in combination, a holddown to engage the sole on a last, a member to engage and hold down a marginal portion of the sole, a gripper to engage the edge of the upper, power means to operate the gripper to pull and stretch the upper on the last, means to lay the stretched upper over the margin of the sole, and means to move said sole controlling member away from the margin of the insole to permit the laying of the upper over said margin.

165. In a machine of the class described, in combination, means to support a last with its sole and shoe upper, a holddown to engage the sole on the last and to clamp the last on its support, a member to engage the marginal portion of the sole, a gripper to engage the edge of the upper, means relatively to move the gripper and said last supporting and clamping means to cause the gripper to pull and stretch the upper on the last, means to lay the stretched upper over the margin of the sole, and means automatically to move said margin engaging member away from the margin of the sole subsequent to the pulling of the upper and prior to the laying of the upper over said margin.

166. In a machine of the class described, in combination, a holddown to engage the sole on a last, a member to engage and hold down the marginal portion of the sole at the toe end of the last, a gripper to engage the upper at said toe end, power operated means relatively to move the last and gripper to cause the gripper to pull and stretch the upper at said end of the last, means to lay the upper over the margin of the sole at said end, and means automatically to withdraw said margin engaging member prior to the overlaying operation.

167. In a machine of the class described, in combination, grippers to engage the upper on a last, means to move the grippers and last relatively to cause the grippers to pull and stretch the upper including a holddown engaging the sole on the last, a sole controlling member mounted independently of the holddown and engaging the margin of the sole, and means to move said sole controlling member away from the sole margin subsequently to the upper pulling operation to permit the laying of the upper over the margin of the sole.

168. In a machine of the class described, in combination, grippers to engage the upper on a last, means relatively to move the grippers and the last to cause the grippers to pull and stretch the upper on the last including a holddown to engage the sole on the last, a sole controlling member mounted independently of the holddown and arranged to engage the margin of the sole, means to lay the pulled and stretched upper over the margin of the sole, and means automatically to retract the said sole controlling member from the margin of the sole in timed relation to the overlaying of the upper.

169. In a machine of the class described, the combination with power operated means for pulling and stretching the upper on a last at the toe end of a last and for subsequently laying the pulled upper over the margin of the sole at the toe end of the last, of means for engaging the margin of the sole at the toe end of the last to prevent it from being lifted from the last, the machine being constructed and organized automatically to cause said margin engaging means to be moved away from the margin of the sole subsequently to the pulling of the upper and prior to the overlaying operation.

170. In a machine of the class described, the combination with a gripper for engaging the upper on a last, a holddown to engage the sole on a last and means for operating said holddown to move the last relatively to the gripper in a direction to cause the gripper to pull and tension the upper on the last, of a member mounted independently of said holddown arranged to engage the margin of the sole and means automatically to move said member coincidently with said movement of the last to maintain said member in engagement with the margin of the sole.

171. In a machine of the class described, the combination with grippers for engaging an upper on a last and means for moving the grippers and last relatively to tension the upper, of a member for engaging the feather of the sole to position it relatively to the last during the upper tensioning operation, means for laying the upper over the margin of the sole, and means for causing said sole engaging member to be withdrawn from the feather of the sole in a direction transverse to the plane of the sole to permit the operation of said overlaying means.

172. In a toe lasting machine, the combination with lasting means for forming the shoe upper against the toe of a last, of pairs of pincers for engaging the edge of the upper at each corner of the toe, and power means for moving the pincers outwardly in time relation with the lasting operation to spread and stretch the upper.

173. A machine of the class described having, in combination, a jack for supporting a last in inverted position with an upper thereon, grippers for seizing and stretching the upper, a holddown, and means for moving said jack and holddown in opposite directions to clamp the shoe.

174. A machine of the class described having, in combination, a jack for supporting a last in inverted position with an upper thereon, grippers arranged for seizing the upper at the forepart and holding it outspread, a holddown, and means for moving said jack and holddown in reverse directions to clamp the shoe.

175. A shoemaking machine having, in combination, toe embracing wipers, and power operated means for relatively moving the shoe and the wipers in suitable engagement to effect automatically a predetermined plural number of upward rubbing actions of the wipers on the toe portion of the shoe upper.

176. A shoemaking machine having, in combination, shoe position controlling means, toe embracing wipers, and power operated mechanism organized to move the shoe and wipers relatively for effecting a predetermined plural number of upward rubbing actions of the wipers on the toe portion of the shoe.

177. A shoemaking machine having, in combination, toe lasting wipers comprising a pair of wiper plates having formed edges curved in substantial conformity to the lateral contour of a shoe about the toe and mounted for relative swinging movement in the plane of their wiping edges toward or from a shoe, means for moving the shoe downwardly through the wipers, and a carrier for the wipers yieldingly mounted for movement to permit the wipers to adjust themselves to the path of the shoe and to cause the wipers to follow up and maintain continuous embracing relation to the toe of the shoe during the movement of the toe through the wipers.

178. A shoemaking machine having, in combination, a heel end abutment, a toe rest, means to engage the shoe bottom, and power operating mechanism constructed and arranged to cause the bottom engaging means to press the shoe down upon the toe rest and to set the heel abutment forwardly against the shoe.

179. A shoemaking machine having, in combination, a heel end abutment, a toe rest, means to engage the shoe bottom and depress the shoe upon the toe rest, and connected operating mechanisms for the depressing means and for the heel abutment.

180. A shoemaking machine having, in combination, toe lasting wipers, a heel end abutment, and power operating mechanism for said wipers and abutment organized to set the heel end abutment forwardly against the shoe in time relation to the advance of the wipers over the toe of the shoe.

181. A shoemaking machine having, in combination, a toe rest and opposed clamping means for the forepart of a shoe, a heel abutment, toe embracing wipers, and operating mechanism for said parts organized to clamp the shoe and automatically lock the heel rest in time relation to the operation of the wipers.

In testimony whereof I affix my signature in presence of two witnesses.

CHARLES F. PYM.

Witnesses:
LEWIS E. FLANDERS,
OTTO F. BARTHEL.